United States Patent
Kim et al.

(10) Patent No.: US 12,468,454 B2
(45) Date of Patent: Nov. 11, 2025

(54) MEMORY CONTROLLER FOR COMMUNICATING MEMORY STATUS INFORMATION, MEMORY SYSTEM INCLUDING THE MEMORY CONTROLLER, AND OPERATING METHOD OF THE MEMORY CONTROLLER

(71) Applicant: Samsung Electronics Co., Ltd., Suwon-si (KR)

(72) Inventors: Daehyun Kim, Suwon-si (KR); Suhyun Kim, Suwon-si (KR); Ikkyun Park, Suwon-si (KR); Hyunju Yi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/670,908

(22) Filed: May 22, 2024

(65) Prior Publication Data

US 2025/0123755 A1 Apr. 17, 2025

(30) Foreign Application Priority Data

Oct. 13, 2023 (KR) .................. 10-2023-0137042
Dec. 12, 2023 (KR) .................. 10-2023-0180103

(51) Int. Cl.
*G06F 3/06* (2006.01)
(52) U.S. Cl.
CPC .......... *G06F 3/0619* (2013.01); *G06F 3/0659* (2013.01); *G06F 3/0679* (2013.01)
(58) Field of Classification Search
CPC ..... G06F 3/0659; G06F 3/0619; G06F 3/0679
See application file for complete search history.

(56) References Cited

U.S. PATENT DOCUMENTS 11,735,278 B2    8/2023   Cha et al.
11,868,647 B2    1/2024   Seo et al.
(Continued)

FOREIGN PATENT DOCUMENTS

EP             4181130 A1    5/2023
KR   10-2011-0111217 A    10/2011
(Continued)

OTHER PUBLICATIONS

Jedec: "Embedded Multimedia Card (e-MMC), Electrical Standard 4.51 JESD84-B451," Jun. 30, 2012, XP093233674.
(Continued)

*Primary Examiner* — Edward J Dudek, Jr.
(74) *Attorney, Agent, or Firm* — HARNESS, DICKEY & PIERCE, P.L.C.

(57) ABSTRACT

An embodiment of the method includes transferring a first read command corresponding to a first cell region of the memory device through a first channel, receiving first data, read from the first cell region, from the memory device through a second channel physically separated from the first channel, transferring a status information request command through the first channel, the status information request command request the transfer of status information about a second cell region of the memory device, receiving the status information about the second cell region from the memory device through the first channel, and transferring a second read command corresponding to the second cell region of the memory device through the first channel, at least a portion of a period in which the status information is received through the first channel overlaps a period where the first data is received through the second channel.

20 Claims, 19 Drawing Sheets

(56) References Cited

U.S. PATENT DOCUMENTS

| | | | |
|---|---|---|---|
| 2014/0082268 A1* | 3/2014 | Kim .................. | G06F 3/0656 |
| | | | 711/103 |
| 2020/0142631 A1* | 5/2020 | Song .................. | G06F 3/0604 |
| 2021/0050067 A1 | 2/2021 | Oh et al. | |
| 2021/0089393 A1* | 3/2021 | Kokubun ............ | H03M 13/45 |
| 2021/0157494 A1* | 5/2021 | Schaefer ............. | G06F 3/0616 |
| 2021/0208815 A1* | 7/2021 | Park .................. | G06F 3/0659 |
| 2022/0222139 A1 | 7/2022 | Shin et al. | |
| 2023/0061144 A1 | 3/2023 | Schaefer | |
| 2023/0162799 A1 | 5/2023 | Seo et al. | |
| 2023/0289059 A1* | 9/2023 | Park .................. | G06F 3/0659 |
| 2023/0393930 A1* | 12/2023 | Balluchi ............. | G06F 3/0659 |
| 2024/0012569 A1 | 1/2024 | Kang et al. | |
| 2024/0028244 A1* | 1/2024 | Weinberg ............ | G06F 3/0679 |

FOREIGN PATENT DOCUMENTS

| | | |
|---|---|---|
| KR | 10-2344380 B1 | 12/2021 |
| KR | 10-2022-0122826 A | 9/2022 |
| KR | 10-2509549 B1 | 3/2023 |
| KR | 10-2023-0074890 A | 5/2023 |

OTHER PUBLICATIONS

European Extended Search Report for corresponding European Patent Application No. 24195506.1 issued on Jan. 7, 2025.

\* cited by examiner

MEMORY CONTROLLER FOR COMMUNICATING MEMORY STATUS INFORMATION, MEMORY SYSTEM INCLUDING THE MEMORY CONTROLLER, AND OPERATING METHOD OF THE MEMORY CONTROLLER

CROSS-REFERENCE TO RELATED APPLICATION

This application is based on and claims priority under 35 U.S.C. § 119 to Korean Patent Application Nos. 10-2023-0137042, filed on Oct. 13, 2023, and 10-2023-0180103, filed on Dec. 12, 2023, in the Korean Intellectual Property Office, the disclosure of which are incorporated by reference herein in their entirety.

BACKGROUND

The inventive concepts relate to memory controllers, and more particularly, to memory controllers for communicating memory status information, memory systems including the memory controllers, and operating methods of the memory controllers.

Flash memory, non-volatile memory, may maintain data stored therein even when power thereto is cut off. Memory systems (or storage devices) such as solid state drives (SSDs) and memory cards are being widely used as memory systems including flash memory and are useful for storing or moving a large amount of data.

In memory cells of flash memory, a degradation phenomenon where the reliability of data is reduced may occur due to various causes, and for example, various factors such as voltage level shifting, process characteristic, and interference with an adjacent cell may cause degradation. Memory systems may perform an error detection/correction operation and a recovery operation so as to secure the reliability of data but have a problem where complicated processes of a recovery operation, which frequently enters a recovery operation mode or takes a long time, may decrease the performance of a memory system.

SUMMARY

The inventive concepts provide to memory controllers that may communicate status information between the memory controllers and memory devices and may thus use the status information in an efficient memory operation, memory systems including the memory controllers, and operating methods of the memory controller.

According to some example embodiments, an operating method of a memory controller controlling a memory device includes transferring a first read command corresponding to a first cell region of the memory device through a first channel, receiving first data, read from the first cell region, from the memory device through a second channel physically separated from the first channel, transferring a status information request command through the first channel, the status information request command requesting the transfer of status information about a second cell region of the memory device, through the first channel, receiving the status information about the second cell region from the memory device through the first channel, and transferring a second read command corresponding to the second cell region of the memory device through the first channel, wherein at least a portion of a period in which the status information is received through the first channel, overlaps a period where the first data is received through the second channel.

According to some example embodiments, a memory controller communicating with a memory device includes a processor configured to control a memory operation on the memory device; a memory interface connected to the memory device through a first channel communicating a command/address and a second channel communicating data, and the second channel is physically separated from the first channel; an error correction code (ECC) circuit configured to perform ECC decoding processing on data read from the memory device to correct an error of the read data; and a status information processor configured to receive and process status information transferred from the memory device through the first channel, the status information representing a degradation status of memory cells of the memory device, the memory controller is configured to receive status information about a first cell region through the first channel before a read operation on a first cell region of a memory cell array of the memory device is performed, and the processor is configured to differently control a read level in a read operation on the first cell region according to a degradation status of memory cells of the first cell region, or differently perform an error correction or recovery operation on data read from the first cell region, based on the status information.

According to some example embodiments, a memory system includes a memory device, the memory device includes a memory cell array including a plurality of pages, each page including a plurality of memory cells; a control logic configured to control a memory operation on the memory cell array and generate status information representing a degradation status of the plurality of memory cells; and an interface circuit configured to communicate a command/address through a first channel and communicate data through a second channel physically separated from the first channel, the interface circuit is configured to sequentially receive from outside, a first read command corresponding to a first page and a second read command corresponding to a second page, receive a status information request command issuing a request to transfer status information about the second page through the first channel before the second read command is received, output the status information about the second page through the first channel, and output, through the second channel, data of the first page read in response to the first read command in parallel with outputting the status information about the second page.

BRIEF DESCRIPTION OF THE DRAWINGS

Example embodiments will be more clearly understood from the following detailed description taken in conjunction with the accompanying drawings in which:

FIG. 5 illustrates an example where a memory controller controls a memory operation based on status information;

FIGS. 13A and 13B to 15 are block diagrams illustrating an implementation example of a memory system according to some example embodiments;

DETAILED DESCRIPTION

It should be understood that, although the terms first, second, third, etc., may be used herein to describe various elements, regions, layers and/or sections, these elements, regions, layers, and/or sections should not be limited by these terms. These terms are only used to distinguish one element, region, layer, or section from another region, layer, or section. Thus, a first element, component, region, layer, or section discussed below could be termed a second element, region, layer, or section without departing from the teachings of example embodiments.

Hereinafter, some example embodiments will be described in detail with reference to the accompanying drawings.

Figure 1:
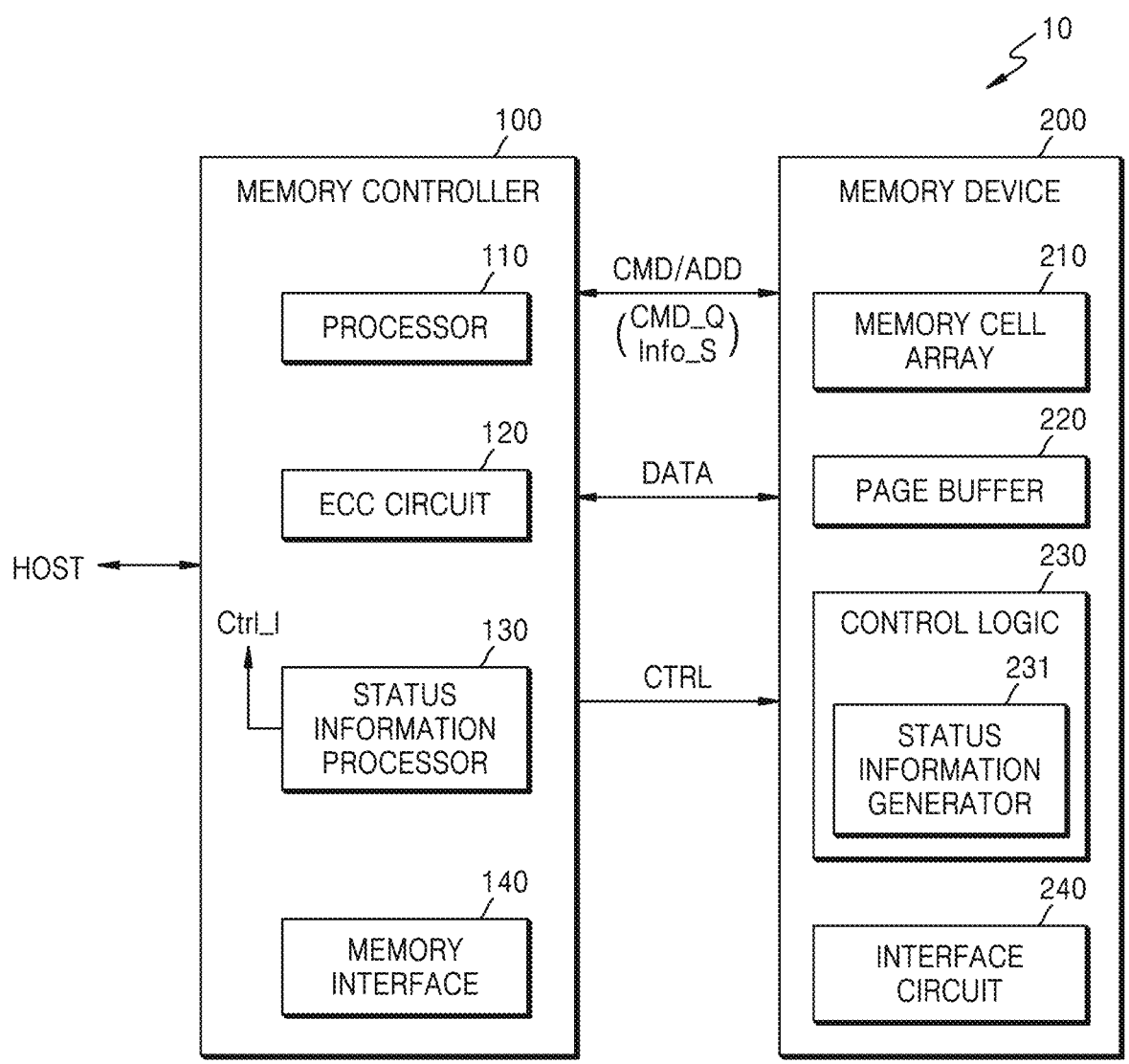
FIG. 1 is a block diagram illustrating a memory system according to some example embodiments.

FIG. 1 is a block diagram illustrating a memory system 10 according to some example embodiments.

Referring to FIG. 1, the memory system 10 may include a memory controller 100 and a memory device 200, and the memory device 200 may include a memory cell array 210, a page buffer 220, a control logic 230, and an interface circuit 240. Also, the control logic 230 may include a status information generator 231. In the example embodiments of FIG. 1, the status information generator 231 is illustrated as being included in the control logic 230, but the status information generator 231 according to some example embodiments may be a separate element outside the control logic 230.

For example, the memory system 10 may communicate with a host through various interfaces, and for example, the memory system 10 may communicate with the host through various interfaces such as universal serial bus (USB), multimedia card (MMC), embedded multi-media card (eMMC), peripheral component interconnection (PCI), PCI express (PIC-E), advanced technology attachment (ATA), serial-ATA (SATA), parallel-ATA (PATA), small computer system interface (SCSI), external SATA (e-SATA), enhanced small disk interface (ESDI), integrated drive electronics (IDE), Firewire, universal flash storage (UFS), and non-volatile memory express (NVMe).

According to some example embodiments, the memory device 200 may include a non-volatile memory device. In some example embodiments, the memory system 10 may be implemented as a memory which is embedded in or is detachably attached to an electronic device. For example, the memory system 10 may be implemented as various types such as an embedded UFS memory device, eMMC, solid state drive (SSD), UFS memory card, compact flash (CF) card, secure digital (SD) card, micro-SD card, mini-SD card, extreme digital (xD) card, and memory stick. Also, the memory system 10 may be referred to as a storage device which stores data in a non-volatile manner.

In response to a write/read request from a host HOST, the memory controller 100 may read data stored in the memory device 200, or may control the memory device 200 to write data in the memory device 200. For example, the memory controller 100 may include a processor 110, and the processor 110 may control the overall operation of the memory controller 100 and may control a memory operation on the memory device 200. In detail, the memory controller 100 may provide a command/address CMD/ADD and a control signal CTRL to the memory device 200, based on control by the processor 110, and may thus control a write operation, a read operation, and an erase operation on the memory device 200. Also, data DATA to be stored in the memory device 200 and data DATA to be read from the memory device 200 may be transferred and received between the memory controller 100 and the memory device 200.

In some example embodiments, the memory cell array 210 may include a three-dimensional (3D) memory cell array, the 3D memory cell array may include a plurality of NAND strings, and each of the NAND strings may include memory cells respectively connected to word lines which are vertically stacked on a substrate. However, the inventive concepts are not limited thereto, and in some example embodiments, the memory cell array 210 may include a two-dimensional (2D) memory cell array, and the 2D memory cell array may include a plurality of NAND strings which are arranged in a row direction and a column direction. Hereinafter, example embodiments will be described, and for example, a case where memory cells are NAND flash memory cells will be described. However, the inventive concepts are not limited thereto, and memory cells may include various kinds of non-volatile memory cells such as resistive random access memory (RAM) (ReRAM), phase change RAM (PRAM), and magnetic RAM (MRAM).

The page buffer 220 may temporarily store data which is to be written in the memory cell array 210 or data which is to be read from the memory cell array 210. The control logic 230 may control the overall operation of the memory device 200, the command/address CMD/ADD and the control signal CTRL and, for example, may output various internal control signals for programming data in the memory cell array 210 or reading data from the memory cell array 210.

According to some example embodiments, the memory controller 100 may further include an error correction code (ECC) circuit 120, a status information processor 130, and a memory interface 140. Although not shown in FIG. 1, the memory controller 100 may further include a host interface (not shown) which performs an interface with the host.

The ECC circuit 120 may perform an error detection/correction operation on data which is read from the memory device 200. Various ECC decoding algorithms based on various error correction capabilities may be applied to the ECC circuit 120, and for example, in a case where the ECC circuit 120 performs error correction based on a low density parity check (LDPC), the memory controller 100 may receive hard decision (HD) data determined with respect to a normal read level and soft decision (SD) data determined with respect to at least one offset read level and may perform an error correction operation based on the HD data and the SD data.

According to some example embodiments, the status information generator 231 of the memory device 200 may generate status information Info_S including various pieces of information associated with statuses of the memory cells. In some example embodiments, the status information Info_S may be generated by the memory device 200 and may be stored in the memory cell array 210. Alternatively, the status information Info_S may be generated by the memory controller 100 and may be stored in the memory cell array 210. Alternatively, based on a request of the memory controller 100, the status information Info_S may be generated by the memory device 200 and may be provided to the memory controller 100 without being separately stored. Alternatively, the status information Info_S may include various pieces of information, some pieces of information may be generated by the memory controller 100, and some other pieces of information may be generated by the memory device 200.

The memory cell array 210 may include a plurality of blocks, each of the blocks may include a plurality of pages, and each of the pages may correspond to a unit of write/read. Also, the status information Info_S may be generated and managed by units of certain memory cells and, for example, may be generated by page units or by various units such as block units.

The status information Info_S may include information associated with a degradation status of each memory cell and in some example embodiments, may be referred to as degradation information or health information. Alternatively, the status information Info_S may include information representing characteristics (for example, threshold voltage distribution characteristics) of the memory cells. In the description of example embodiments, the status information Info_S may be defined as including various kinds of pieces of information capable of being used in association with a memory operation such as data write/read and error correction, in addition to information representing the degree of degradation of the memory cells.

In some example embodiments, the status information Info_S may include a cell counting value (for example, an on-chip valley search (OVS) counting value), a history read level, a write/erase counting value, and a previous error value. For example, the memory device 200 may count each of on cells (or off cells) with respect to at least two read levels near a valley between threshold voltage distributions and may provide a difference value between counting results as the OVS counting value. The memory controller 100 may refer to the OVS counting value, and may thus determine the degree of degradation of the memory cells or may determine an optimal or desired valley between threshold voltage distributions.

Also, in a case where an error does not occur or only a correctable error occurs in a read operation, a read level used in the read operation may be managed as history read level information. For example, the history read level information may be managed by page units or block units included in the memory cell array 210. Alternatively, the history read level information may be managed by super block units configured with a plurality of blocks included in each of a plurality of memory chips. The memory device 200 may store the history read level information and may provide the history read level information as the status information Info_S to the memory controller 100.

Also, the write/erase counting value may be managed by block units or page units included in the memory cell array 210 and may be referred to when determining the lifetime of each block or page. For example, the write counting value may be managed by page units and the erase counting value may be managed by block units. The memory controller 100 may perform a counting operation whenever a write/erase operation is performed on the memory cell array 210 and may store the write/erase counting value in the memory device 200. The memory device 200 may provide the write/erase counting value as the status information Info_S to the memory controller 100 based on a request from the memory controller 100.

Also, the previous error value may include information associated with an error occurring in a previously performed read operation and, for example, may include information about the number of errors (or a bit error rate) of data occurring by error detection/correction units or page units. The status information Info_S associated with the previous error value may be managed by a certain unit, and, for example, the memory controller 100 may store information about an error value, detected by page units, in the memory device 200. The memory device 200 may provide the previous error value as the status information Info_S to the memory controller 100.

The memory controller 100 may receive the status information Info_S from the memory device 200 and may control a next memory operation based on the status information Info_S. For example, the memory controller 100 may control a read level in a read operation, based on the status information Info_S, or may perform a control operation of selecting the kind of data which is to be read. Also, the memory controller 100 may correct an error of data or may perform a recovery operation, based on various kinds of algorithms, and moreover, the memory controller 100 may perform an optimal or desired error correction operation or an optimal or desired recovery operation with reference to the status information Info_S.

In some example embodiments, the memory controller 100 may communicate the command/address CMD/ADD and data DATA through a channel separated from the memory device 200. For example, a first channel for transferring the command/address CMD/ADD may be physically separated from a second channel for transferring the data DATA, and the memory interface 140 may communicate with the interface circuit 240 through the first channel and the second channel. The first channel may be referred to as a command/address channel or a command/address bus, and the second channel may be referred to as a data channel or a data bus.

In some example embodiments, the status information Info_S may be transferred from the memory device 200 to the memory controller 100 through the first channel. Therefore, the status information Info_S may be provided to the memory controller 100 in parallel with a period where data is communicated between the memory controller 100 and the memory device 200. Alternatively, at least a portion of a period where the status information Info_S is provided to the memory controller 100 may overlap a period where data is communicated.

In some example embodiments, a separate command (hereinafter, referred to as a status information request command CMD_Q) for transferring the status information Info_S between the memory controller 100 and the memory device 200 may be defined. The memory controller 100 may output the status information request command CMD_Q, which issues a request to transfer the status information Info_S about a certain unit (for example, a page unit, a block unit, or a chip unit) including data of a certain cell region, before outputting a read command which issues a request to read the data of the certain cell region. For example, as described above, because the first channel is physically separated from the second channel, the memory controller 100 may output the status information request command CMD_Q to the memory device 200 and receive the status information Info_S from the memory device 200 in the middle of communicating data DATA with the memory device 200.

The status information processor 130 may perform a processing operation on the status information Info_S, may generate control information Ctrl_I so that a write/read operation, an error detection/correction operation, or a recovery operation is performed based on the status information Info_S, and may provide the control information Ctrl_I to the elements of the memory controller 100. For example, the memory controller 100 may use one or more recovery modules for recovering an error, and when an error of read data is not corrected, the memory controller 100 may perform a recovery operation for recovering the error of the data, based on control by the processor 110. In some example embodiments, a plurality of recovery modules may have different recovery capabilities, based on consumed resource and time, and as a recovery module optimized or desired for the degree of degradation of the memory cells is selected based on the control information Ctrl_I, the performance of an undesired recovery operation may be prevented or reduced in likelihood. The status information processor 130 or each recovery module may be configured as hardware, software, or a combination thereof, and a control operation using the control information Ctrl_I may be performed through hardware processing or software processing.

According to some example embodiments, without reducing the transfer efficiency of data, the memory controller 100 may receive the status information Info_S from the memory device 200 by using a command/address channel capable of performing bidirectional communication and may use the received status information Info_S in a memory operation for enhancing the reliability of data.

Also, according to some example embodiments, the status information Info_S may be stored in the memory device 200, read from the memory device 200 in response to a command of the memory controller 100, and provided to the memory controller 100, and thus, the memory controller 100 may not need to include expensive high-speed random access memory (RAM) for storing status information, thereby decreasing the manufacturing cost of a memory system. Moreover, because the status information Info_S may be stored in the memory cell array 210 having large capacity, the status information Info_S may be generated and managed by units of page having a relatively small size, and thus, the degree of degradation of the memory cells may be accurately determined and a memory operation optimized or desired for the degree of degradation may be controlled.

In some example embodiments described above, a case where the status information Info_S is transferred through a command/address channel has been described, but example embodiments are not limited thereto. For example, each of the memory controller 100 and the memory device 200 may further include at least one other channel for transferring various pieces of information, and by using a channel without reducing transfer efficiency of data, the communication of the status information request command CMD_Q and the status information Info_S may be performed.

The elements of the memory device 200 illustrated in FIG. 1 may be elements included in one memory chip or die. In some example embodiments, the memory system 10 may include a plurality of memory chips, and the memory controller 100 may communicate with the plurality of memory chips through different channels. For example, the memory device 200 may include a plurality of memory chips, and each of the memory chips may include the elements of the memory device 200 illustrated in FIG. 1.

Figure 2:
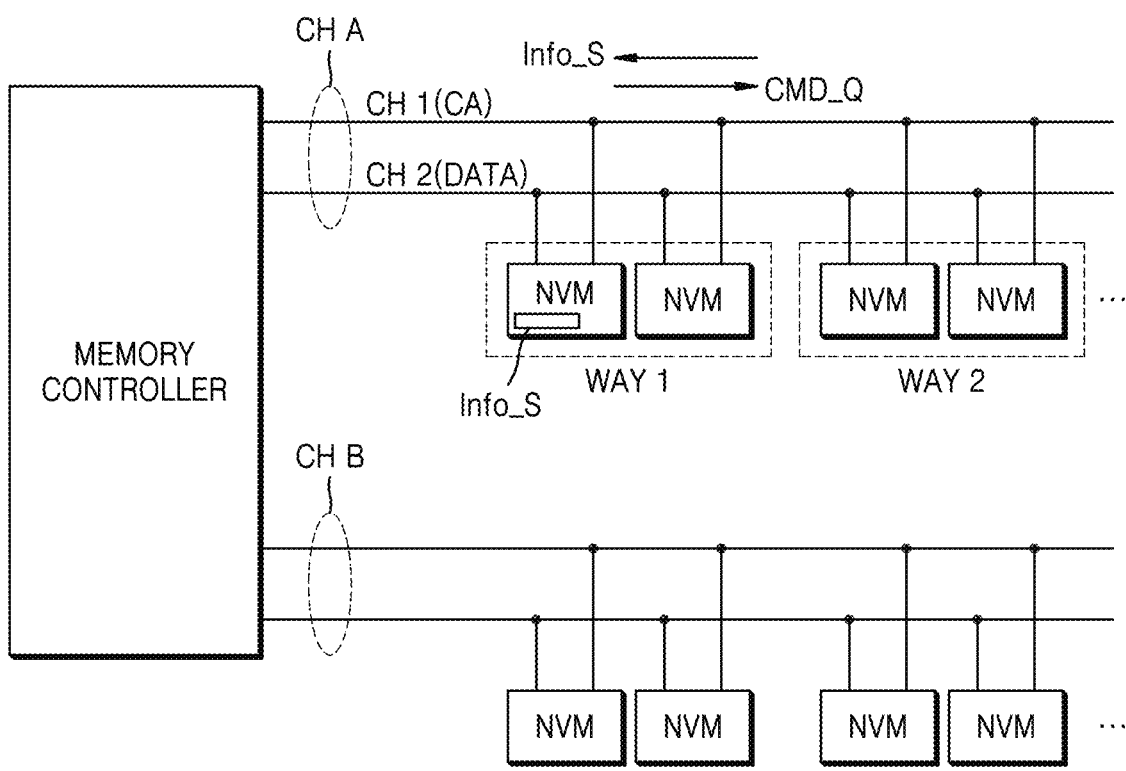
FIG. 2 is a diagram illustrating a concept of channel interleaving and way interleaving in a memory system including a plurality of memory chips.

FIG. 2 is a diagram illustrating a concept of channel interleaving and way interleaving in a memory system including a plurality of memory chips.

Referring to FIG. 2, the memory system may include a memory controller, and the memory controller may be connected to a plurality of memory devices (for example, non-volatile memory devices NVM) through one or more channels. Also, each of the memory devices NVM may store the status information Info_S according to the example embodiments described above. For example, the memory controller may be connected to one or more memory devices NVM through an Ath channel CH A and may be connected to one or more memory devices NVM through an Bth channel CH B. Moreover, according to the example embodiments described above, a command/address channel may be physically separated from a data channel, and the Ath channel CH A may include a first channel CH 1 corresponding the command/address channel and a second channel CH 2 corresponding the data channel. The Ath channel CH A and the Bth channel CH B may communicate data in parallel, and the parallel data communication may be referred to as channel interleaving.

Each of the channels may correspond to a plurality of ways representing a logical path. For example, the Ath channel CH A may correspond to a first way WAY 1 and a second way WAY 2, and each of the ways may include one or more memory devices NVM. In the example embodiments of FIG. 2, a case where each way includes two memory devices NVM is illustrated. In an implementation of some example embodiments, the memory devices NVM of each way may correspond to a memory chip included in the same package or may correspond to a memory die, but the memory system according to example embodiments are not limited thereto and may be implemented as various types.

A memory operation on each of the Ath channel CH A and the Bth channel CH B may be independently performed and may be performed in parallel. On the other hand, the first way WAY 1 and the second way WAY 2 may share the Ath channel CH A, and thus, a data input/output (I/O) on the memory devices NVM of the first way WAY 1 and the second way WAY 2 may be performed by an interleaving scheme.

In a way interleaving structure described above, the data channel may be shared by at least two memory devices NVM, and thus, channel efficiency and performance may be enhanced. However, considering the time consumed in inputting/outputting data and the time consumed in correcting/recovering an error of data, a limitation may occur in increasing the number of memory devices NVM sharing a channel. On the other hand, according to some example embodiments, the status information request command CMD_Q and the status information Info_S may be communicated by using the command/address channel physically separated from the data channel and may thus prevent or reduce in likelihood a reduction in bandwidth of data transfer. Also, by using the status information Info_S, the data channel may be efficiently used in association with a data write/read operation and the correction/recovery of a data error, and moreover, the time and resources consumed in correcting/recovering an error of data may be reduced, thereby enhancing the total efficiency and performance of a memory system.

Figure 3:
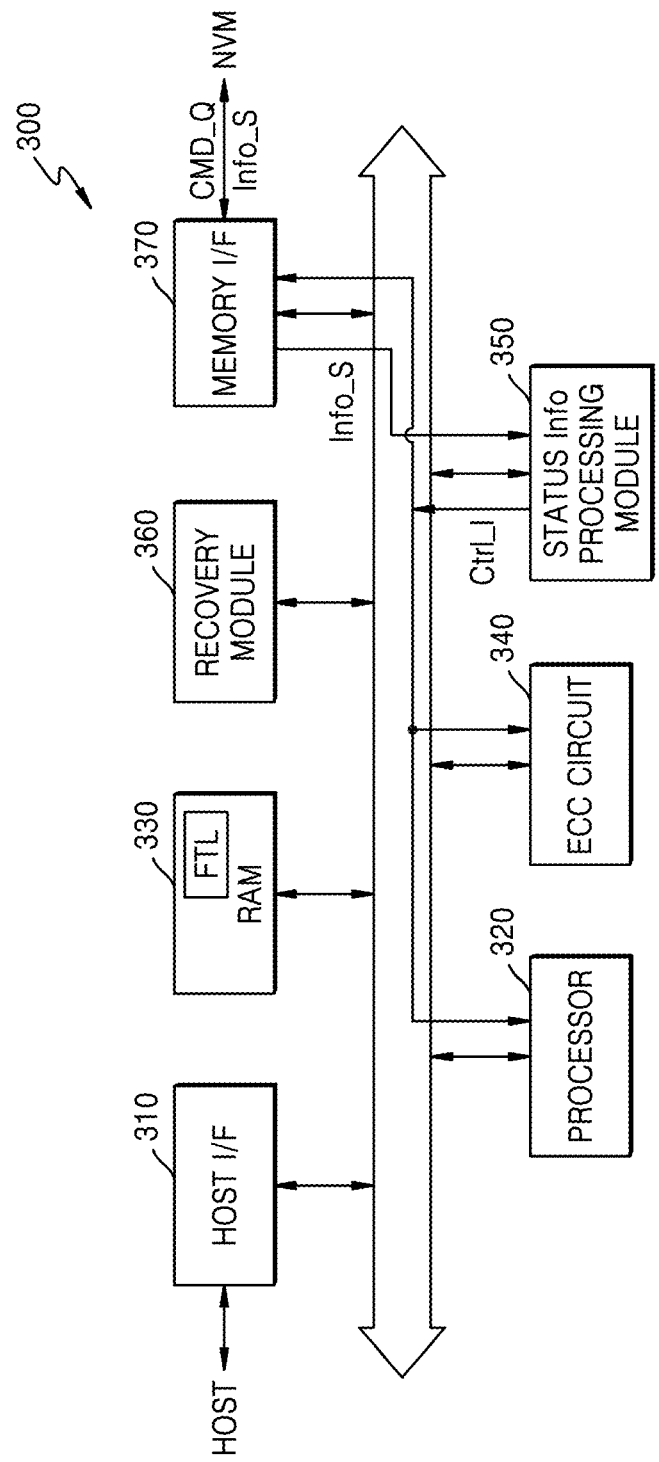
FIG. 3 is a block diagram illustrating an implementation example of a memory controller according to some example embodiments.

FIG. 3 is a block diagram illustrating an implementation example of a memory controller 300 according to some example embodiments.

Referring to FIG. 3, the memory controller 300 may include a host interface 310, a processor 320, random access memory (RAM) 330, an error correction code (ECC) circuit 340, a status information processing module 350, a recovery module 360, and a memory interface 370. Also, the RAM 330 may be used as a working memory, and the processor 320 may execute firmware loaded into the RAM 330 to control the overall operation of the memory controller 300. The RAM 330 may be implemented as various memories and, for example, may be implemented as at least one of resistive memory devices such as a cache memory, dynamic RAM (DRAM), static RAM (SRAM), and PRAM.

As an example of firmware, a flash translation layer (FTL) may be loaded into the RAM 330, and various functions associated with a flash memory operation may be performed by driving the FTL. Moreover, according to the example embodiments described above, the recovery module 360 may perform one or more recovery operations, and in a case where a recovery operation is performed by software, based on control by the processor 320, the recovery module 360 may include software corresponding to a recovery algorithm loaded into the RAM 330.

In some example embodiments, the status information processing module 350 may be implemented by hardware, software, or a combination thereof. For example, when the status information processing module 350 is firmware and is implemented by software, the status information processing module 350 may be loaded into the RAM 330 and may be executed by the processor 320. Alternatively, when the status information processing module 350 is implemented by hardware, the status information processing module 350 may include circuits which perform logic processing on status information provided from the memory device NVM.

The host interface 310 may communicate with the host through various kinds of interfaces according to the example embodiments described above. Also, the memory interface 370 may provide a physical connection between the memory controller 300 and the memory device NVM. For example, a command/address and data may be transferred and received between the memory controller 300 and the memory device NVM through the memory interface 370, and according to the example embodiments described above, a command/address channel and a data channel between the memory controller 300 and the memory device NVM may be physically separated from each other. Also, in the example embodiments described above, the status information request command CMD_Q and the status information Info_S may be communicated between the memory controller 300 and the memory device NVM through the command/address channel.

The ECC circuit 340 may perform an error detection and correction operation on data read from the memory device NVM, and when an error occurs or is not corrected, the determination of data fail may be performed. In some example embodiments, the ECC circuit 340 may perform ECC decoding processing having different correction capabilities, and according to the example embodiments described above, optimal or desired ECC decoding processing corresponding to the degree of degradation of memory cells may be performed based on the status information Info_S. For example, when ECC decoding processing using HD data is defined as an error correction operation and SD ECC decoding processing using the HD data and SD data is defined as a recovery operation applied to the memory system, a memory operation may be controlled so that a recovery operation using the HD data and the SD data is performed without performing ECC decoding processing using the HD data, based on the status information Info_S.

The status information processing module 350 may generate control information Ctrl_I corresponding to information available by the memory controller 300 through processing of the status information Info_S received from the memory device NVM. The memory controller 300 may control a memory operation on the memory device NVM based on the control information Ctrl_I, and for example, the memory controller 300 may control a read level in a read operation or may control the kind of data (for example, the HD data and the SD data) read from the memory device NVM. Also, the memory controller 300 may control an error detection/correction operation of data and may control a recovery operation for recovering an error of the data, based on the control information Ctrl_I. For example, the control information Ctrl_I may be provided to the processor 320, and the processor 320 may perform a control operation so that a recovery operation optimized or desired for degradation statuses of the memory cells is performed. Also, the control information Ctrl_I may be provided to the ECC circuit 340, and the ECC circuit 340 may perform a control operation so that ECC decoding processing optimized or desired for a degradation status of each of the memory cells is performed, based on the control information Ctrl_I. Also, the control information Ctrl_I may be provided to the memory interface 370, and for example, the memory interface 370 may add information (for example, level offset information), associated with a read level to be used in a read operation, to a read command, or may output as separate information, based on the control information Ctrl_I.

The recovery module 360 may include an element for recovering an error of data read from the memory device NVM. The recovery module 360 may support a plurality of recovery operations having different recovery capabilities, based on consumed resources and time. For example, in methods of recovering an error of data, a read retry operation of changing read levels to read data may be performed, or ECC decoding processing using the SD data read based on at least two offset read levels described above may be performed, or an algorithm for detecting an optimal or desired valley between threshold voltage distributions of memory cells may be performed, or a recovery operation (for example, redundant array of independent disks (RAID)) further using pieces of data other than read-requested data may be performed.

In the example embodiments illustrated in FIG. 3, it has been described that the status information processing module 350 generates separate control information Ctrl_I, but example embodiments are not limited thereto. For example, the control information Ctrl_I may correspond to the same information as the status information Info_S, or the processor 320 may directly process the status information Info_S to control various operations of the memory controller 300.

Figure 4:
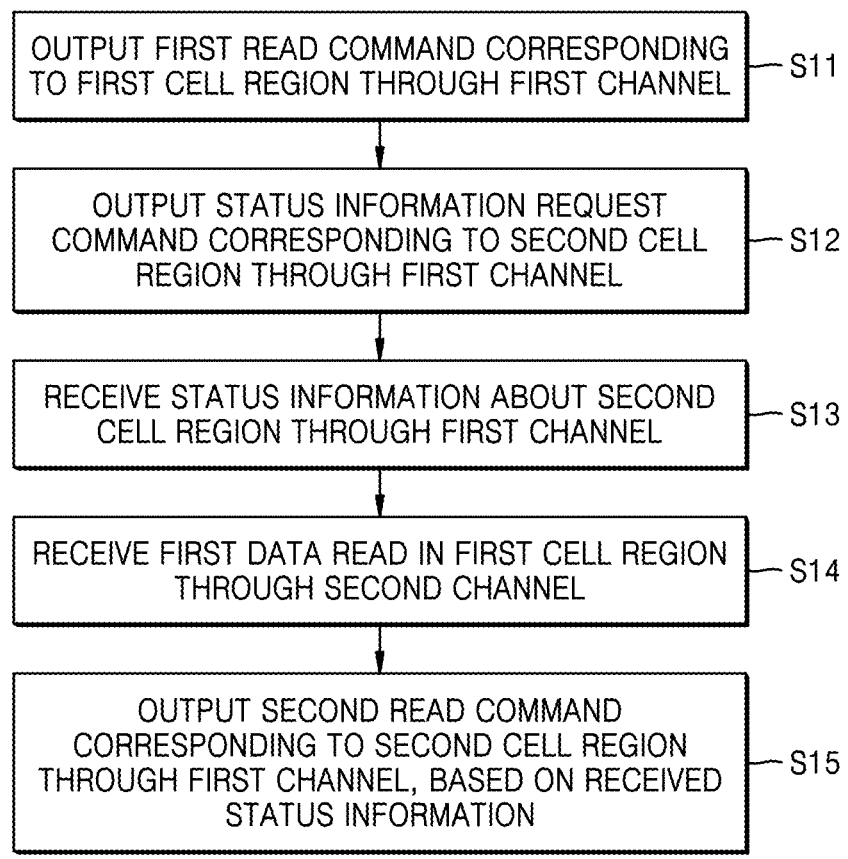
FIGS. 4 and 5 are flowcharts illustrating an operating method of a memory system, according to some example embodiments.
Figure 5:
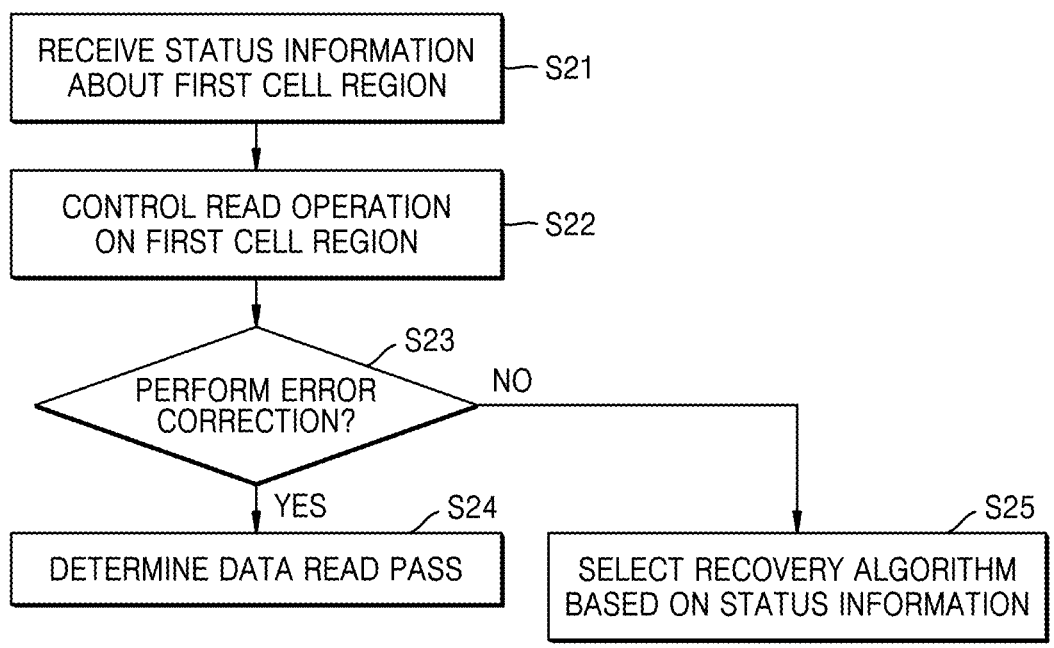

FIGS. 4 and 5 are flowcharts illustrating an operating method of a memory system, according to some example embodiments. Each operation illustrated in FIGS. 4 and 5 may be an operation performed by a memory controller or an operation performed by a memory device.

Referring to FIG. 4, the memory device may include one or more memory chips, each of the memory chips may include a plurality of blocks, and each of the blocks may include a plurality of memory cells. In a cell region including memory cells having a certain size, for example, the memory controller may output a first read command of a first cell region of the memory device through a first channel for command/address in operation S11.

Subsequently, the memory controller may output, through the first channel, a status information request command which issues a request to provide status information about memory cells of a second cell region of the memory device in operation S12. In some example embodiments, a memory cell array of the memory device may store pieces of status information about a plurality of cell regions, and the memory controller may add an address, representing the second cell region of the plurality of cell regions, to the status information request command. The memory device may generate status information about the second cell region or may read the status information about the second cell region, indicated by the address, from the memory cell array, and may output the status information about the second cell region through the first channel. The memory controller may receive status information from the memory device through the first channel in operation S13.

In operation S14, the memory controller may receive read first data through a second channel for data in response to the first read command previously output. The first channel for command/address may be physically separated from the second channel for data, and thus, a period where the first data is received may overlap at least a portion of a period where a status information request command is output and a period where status information is received. Also, in operation S15, the memory controller may output a second read command of the second cell region through the first channel, based on the received status information. In some example embodiment, the second read command may be output to the memory device through the first channel before the memory controller completes the reception of the first data, and thus, at least a portion of a period where the second read command is output may overlap a period where the first data is received.

In some example embodiments, each of the first and second cell regions may be an element included in an arbitrary block. For example, the first and second cell regions may be included in the same memory chip, or may be included in different memory chips. Also, the first and second cell regions may be included in the same block, or may be included in different blocks.

FIG. 5 illustrates some example embodiments where a memory controller controls a memory operation based on status information.

Referring to FIG. 5, the memory controller may receive status information about memory cells of a first cell region in operation 521, and for example, the status information may represent degradation statuses of the memory cells of the first cell region where a read operation is to be performed subsequently. The memory controller may control various memory operations on a memory device based on the status information and, for example, may control a read operation on the first cell region in operation S22.

In some example embodiments, the memory controller may control a read level when performing a read operation on the first cell region, based on the status information. For example, when the status information includes information which is referred to when determining an optimal or desired read level such as an OVS counting value or a history read level, the memory controller may provide the memory device with offset information (difference value information with respect to a reference level) or a value of a read level in a process of controlling a read operation and may thus control the read level.

The memory controller may receive data of a first cell region read from the memory device and may perform an error correction operation based on ECC decoding processing in operation S23, and when an error does not occur or is corrected, the memory controller may determine a data read pass in operation S24. On the other hand, when an error is not corrected by ECC decoding processing, a recovery algorithm corresponding to the status information may be selected from among various recovery algorithms applied to the memory controller in operation S25. For example, first to Nth recovery algorithms may be applied and sequentially performed based on the error recovery capability of data, and some of the first to Nth recovery algorithms may be selectively performed based on the degree of degradation of the memory cells of the first region determined based on the status information.

As described above, reading of data may be performed by page units, and in the example embodiments described above, a cell region may correspond to a page. Also, status information may be managed by various units such as page, a plurality of pages, block, or chip units, and pieces of status information may be stored in a memory cell array of the memory device. For example, in a case where status information is managed by page units, status information corresponding to a page to be subsequently read may be selected and provided to the memory controller, based on a request of the memory controller.

Alternatively, in various example embodiments, status information may be generated and managed with a relatively large size like a plurality of pages or blocks, and status information corresponding to a unit including a page to be subsequently read may be selected and provided to the memory controller, based on a request of the memory controller. According to the example embodiments described above, when outputting a status information request command, the memory controller may add an address, which is for selecting one piece of status information from among pieces of status information, to the status information request command.

In the following example embodiments, it may be described that status information is generated and managed by page units and the memory controller issues a request to transfer the status information by page units, but as described above, example embodiments are not limited thereto.

Figure 6:
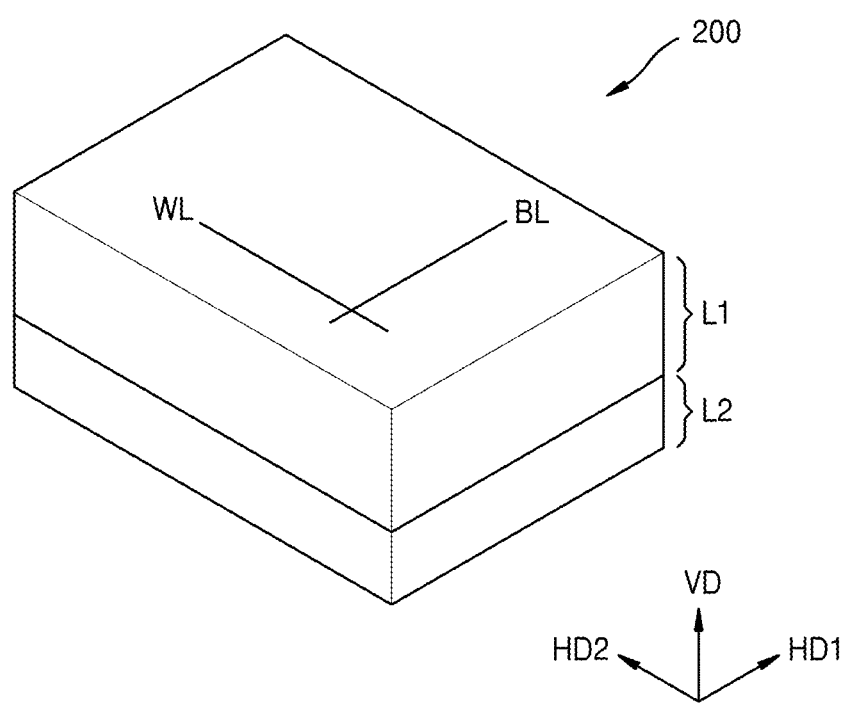
FIG. 6 is a diagram schematically illustrating a structure of the memory device of FIG. 1 according to some example embodiments.
Figure 7:
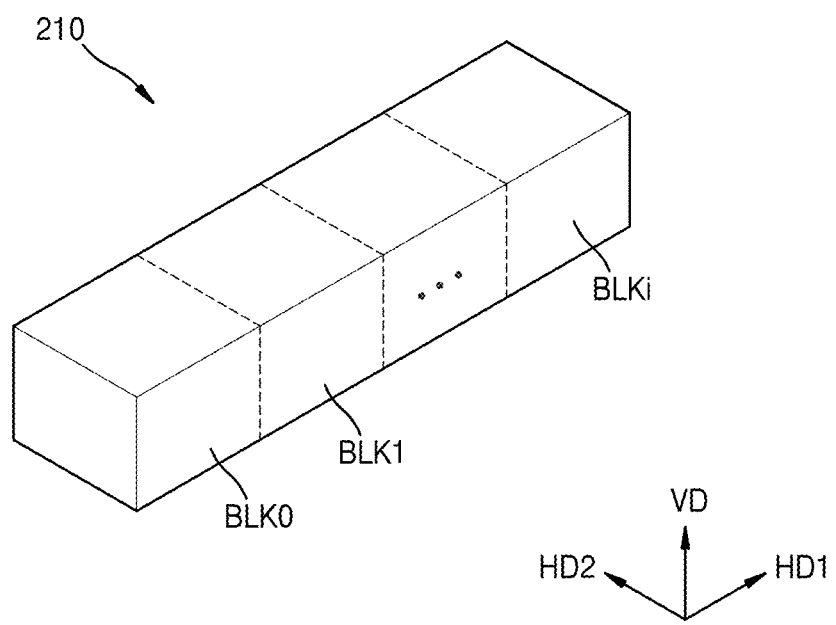
FIG. 7 is a diagram illustrating a memory cell array of FIG. 1.
Figure 8:
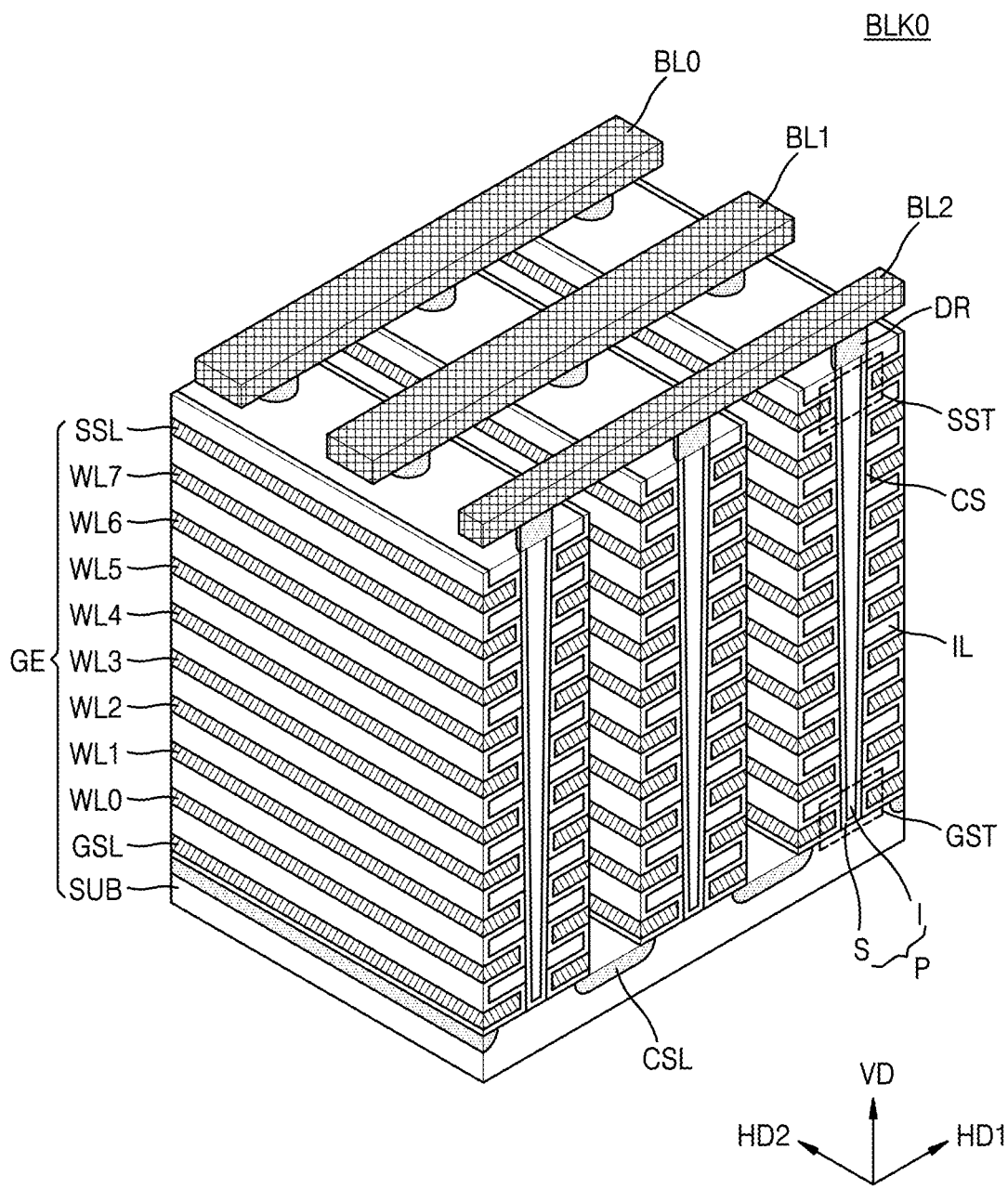
FIG. 8 is a perspective view illustrating an example of a structure of a block included in the memory cell array of FIG. 7.

FIG. 6 is a diagram schematically illustrating a structure of the memory device of FIG. 1 according to some example embodiments, FIG. 7 is a diagram illustrating the memory cell array 210 of FIG. 1, and FIG. 8 is a perspective view illustrating an example of a structure of a block included in the memory cell array 210 of FIG. 7. In FIG. 8, a cell over periphery (COP) structure is illustrated as an implementation example of a memory device, but example embodiments are not limited thereto and a memory device may be implemented having various structures.

Referring to FIG. 6, a memory device 200 may include a first semiconductor layer L1 and a second semiconductor layer L2, and the first semiconductor layer L1 may be stacked in a vertical direction VD on the second semiconductor layer L2. In detail, the second semiconductor layer L2 may be disposed in the vertical direction VD under the first semiconductor layer L1, and thus, the second semiconductor layer L2 may be disposed close to a substrate.

In some example embodiment, the memory cell array 210 of FIG. 1 may be formed in the first semiconductor layer L1, and other peripheral circuits of FIG. 1 may be formed in the second semiconductor layer L2. Accordingly, the memory device 200 may have a structure (e.g., a COP structure) where the memory cell array 210 is disposed on a peripheral circuit. The COP structure may effectively decrease a horizontal-direction area and may enhance the degree of integration of the memory device 200.

In some example embodiments, the second semiconductor layer L2 may include the substrate, and a peripheral circuit may be formed in the second semiconductor layer L2 by forming transistors and metal patterns, which are for wiring the transistors, on the substrate. After the peripheral circuit is formed in the second semiconductor layer L2, the first semiconductor layer L1 including the memory cell array 210 may be formed, and metal patterns for electrically connecting word lines WL and bit lines BL of the memory cell array 210 to the peripheral circuit formed in the second semiconductor layer L2 may be formed. For example, the bit lines BL may extend in a first horizontal direction HD1 and the word lines WL may extend in a second horizontal direction HD2.

Referring to FIG. 7, a memory cell array 210 may include a plurality of blocks BLK0 to BLKi, where i may be a positive integer. Each of the plurality of blocks BLK0 to BLKi may have a 3D structure (or a vertical structure). In detail, each of the plurality of blocks BLK0 to BLKi may include a plurality of NAND strings extending in the vertical direction VD. In this case, the plurality of NAND strings may be provided apart from one another by a certain distance in the first and second horizontal directions HD1 and HD2. The plurality of blocks BLK0 to BLKi may be selected by a row decoder (not shown) of the memory device 200. For example, the row decoder may select a block corresponding to a block address from among the plurality of blocks BLK0 to BLKi.

Referring to FIG. 8, the block BLK0 may be formed in a vertical direction with respect to a substrate SUB. The substrate SUB may have a first conductive type (for example, a p type), and a common source line CSL which extends in the second horizontal direction HD2 and is doped with impurities of a second conductive type (for example, n type) may be provided on the substrate SUB. A plurality of insulation layers IL extending in the second horizontal direction HD may be sequentially provided in the vertical direction VD in a region of the substrate SUB between two adjacent common source lines CSL, and the plurality of insulation layers IL may be apart from one another by a certain distance in the vertical direction VD. For example, the plurality of insulation layers IL may include an insulating material such as silicon oxide.

A plurality of pillars P which are sequentially arranged in the first horizontal direction HD1 and respectively pass through the plurality of insulation layers IL in the vertical direction VD may be provided in a region of the substrate SUB between two adjacent common source lines CSL. For example, the plurality of pillars P may pass through the plurality of insulation layers IL and may contact the substrate SUB. In detail, a surface layer S of each of the pillars P may include a silicon material of a first type and may function as a channel region. An inner layer I of each pixel P may include an air gap or an insulating material such as silicon oxide.

In a region between two adjacent common source lines CSL, a charge storage layer CS may be provided along the insulation layers IL, the pillars P, and an exposed surface of the substrate SUB. The charge storage layer CS may include a gate insulation layer (or referred to as a tunneling insulation layer), a charge trap layer, and a blocking insulation layer. For example, the charge storage layer CS may have an oxide-nitride-oxide (ONO) structure. Moreover, a gate electrode GE such as word lines WL0 to WL7 and selection lines GSL and SSL may be provided on an exposed surface of the charge storage layer CS, in a region between two adjacent common source lines CSL.

Drains or drain contacts DR may be respectively provided on the plurality of pillars P. For example, the drains or the drain contacts DR may include a silicon material doped with impurities of the second conductive type. Bit lines BL1 to BL3 which extend in the first horizontal direction HD1 and are apart from by one another by a certain distance in the second horizontal direction HD2 may be provided on the drains drain contacts or DR.

Figure 9:
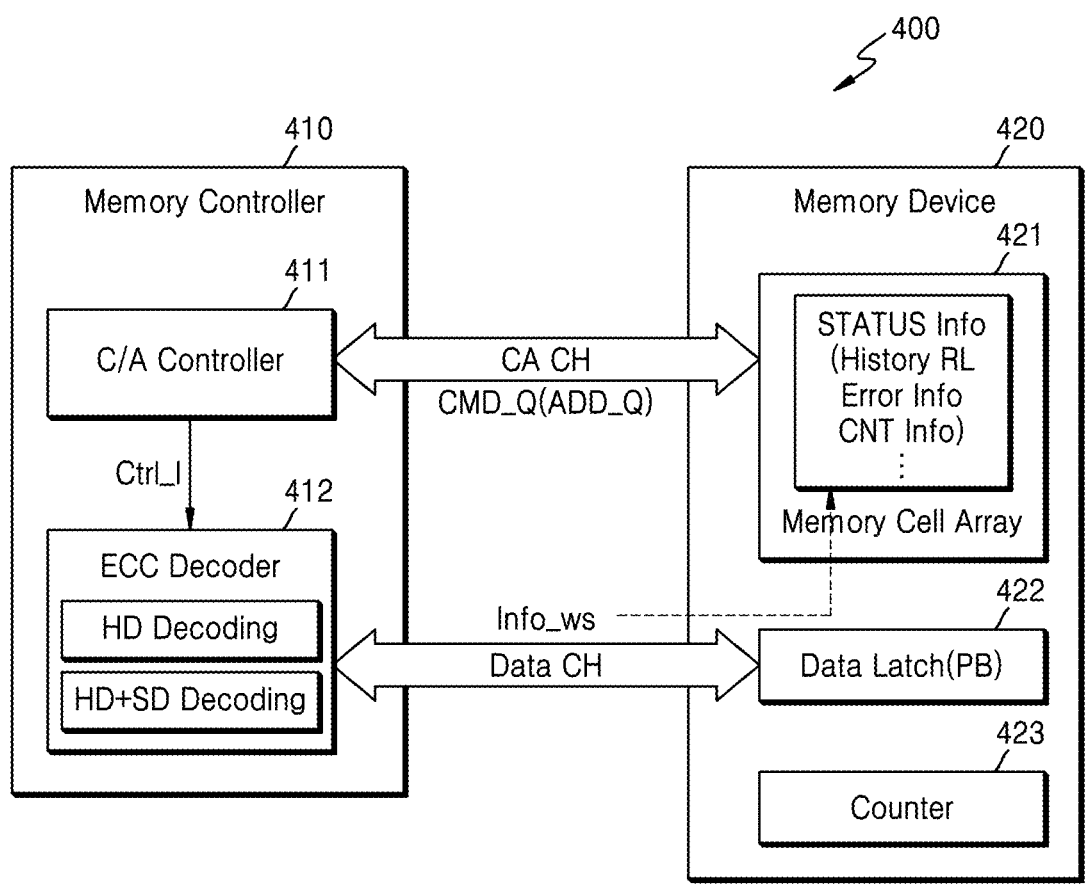
FIG. 9 is a block diagram illustrating an example where status information is stored in a memory cell array, according to some example embodiments.

FIG. 9 is a block diagram illustrating an example where status information is stored in a memory cell array, according to some example embodiments.

Referring to FIG. 9, a memory system 400 may include a memory controller 410 and a memory device 420, and the memory controller 410 and the memory device 420 may communicate with each other through a command/address channel CA CH and a data channel Data CH, which are physically separated from each other. Also, the memory controller 410 may include a command/address controller 411, which includes elements associated with processing of information transferred and received through the command/address channel CA CH, and an ECC decoder 412, which performs ECC decoding processing on data. Also, the memory device 420 may include a memory cell array 421, a data latch 422, and a counter 423, and the data latch 422 may include circuits which temporarily store data read from the memory cell array 421. For example, the data latch 422 may be an element included in the page buffer PB according to some example embodiments, or may be an element which receives data from the page buffer PB and temporarily stores the received data.

The memory cell array 421 may include a storage space which stores information other than user data, and status information according to the example embodiments described above may be stored in the memory cell array 421. For example, status information according to example embodiments may be generated by the memory controller 410 and may be stored in the memory cell array 421, or may be generated by the memory device 420 and may be stored in the memory cell array 421. Alternatively, some status information may be generated by the memory device 420 and may be provided to the memory controller 410 in response to a status information request command CMD_Q from the memory controller 410, without being stored in the memory cell array 421. Also, according to the example embodiments described above, an address ADD_Q may be provided to the memory device 420 through the command/address channel CA CH in association with a selection of pieces of status information stored in the memory cell array 421.

Also, when status information generated and provided by the memory controller 410 is defined as write status information Info_ws, the memory device 420 may receive the write status information Info_ws and may store the write status information Info_ws as status information in the memory cell array 421. The write status information Info_ws may be provided to the memory device 420 according to various schemes, and for example, similar to a normal write operation, the write status information Info_ws may be provided to the memory device 420 through the data channel Data CH.

At least some of various kinds of status information may be read from the memory cell array 421 and may be output to the memory controller 410, and status information stored in the memory cell array 421 may include information such as a history read level, a previous error value, and a write/erase counting value. Alternatively, some status information may be generated by the memory device 420 and may be provided to the memory controller 410 through the command/address channel CA CH, without being stored in the memory cell array 421, and for example, the counter 423 may calculate an OVS counting value, based on a cell counting (for example, on cell or off cell counting) operation, and the memory device 420 may output the OVS counting value as status information to the memory controller 410.

The command/address controller 411 may include a status information processor (not shown) according to the example embodiments described above and may provide the ECC decoder 412 with control information Ctrl_I based on a result obtained by processing the status information. The ECC decoder 412 may receive data through the data channel and may control ECC decoding processing on the data, based on the control information Ctrl_I from the command/address controller 411. As an example of operation, the memory controller 410 may control a read operation of HD data and a read operation of SD data on the memory device 420 based on the status information, and the ECC decoder 412 may perform HD ECC decoding processing using the HD data or may perform SD ECC decoding processing using the HD data and the SD data, based on the control information Ctrl_I.

In some example embodiments, the status information provided to the memory controller 410 may include only one kind of information, or may include at least two kinds of pieces of information. The memory controller 410 may determine the degree of degradation or an optimal or desired read level of memory cells by using each piece of information. Alternatively, the memory controller 410 may receive at least two pieces of information as status information and may determine the degree of degradation of the memory cells based on a combination of the at least two pieces of information.

Figure 10:
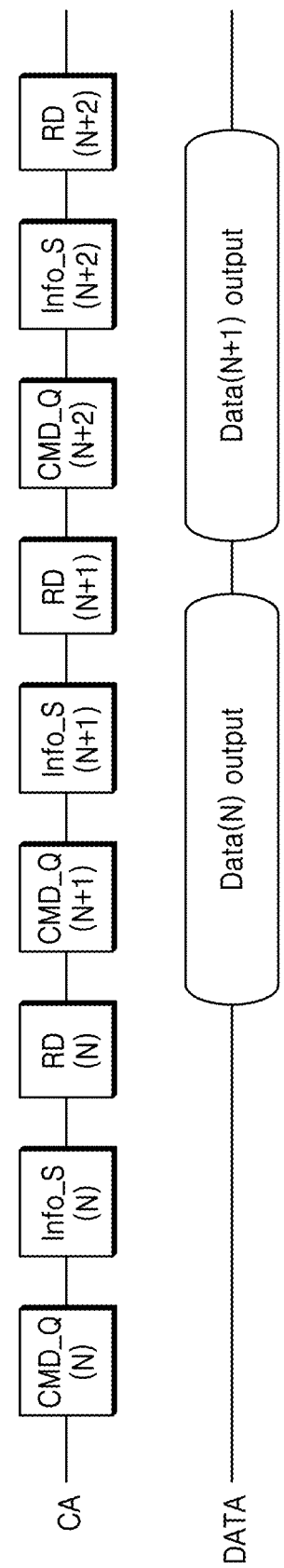
FIG. 10 is a diagram illustrating an example of transfer timing of status information, according to some example embodiments.

FIG. 10 is a diagram illustrating an example of transfer timing of status information, according to some example embodiments. In FIG. 10, a case where the memory controller sequentially reads data of an Nth page and data of an Nth+1 page is illustrated, and each of the Nth page and the Nth+1 page may be a page which is included in an arbitrary block of an arbitrary memory chip.

Referring to FIG. 10, the memory controller may output a status information request command CMD_Q(N), which requests status information about the Nth page, through a command/address CA channel. For example, the memory controller may determine a page of a memory device which will subsequently perform read, and based thereon, the memory controller may output the status information request command CMD_Q(N). The memory controller may receive, from the memory device, status information Info_S(N), representing degradation statuses of memory cells of the Nth page.

Subsequently, the memory controller may output a first read command RD(N) corresponding to the Nth page and may receive first data Data(N), responding to the first read command RD(N), through a data DATA channel. Subsequently, the memory controller may output a status information request command CMD_Q(N+1) which requests status information about the Nth+1 page and may also receive status information Info_S(N+1) representing degradation statuses of memory cells of the Nth+1 page. According to the example embodiments described above, at least a portion of a period where the status information request command CMD_Q(N+1) is output and a period where the status information Info_S(N+1) is received may overlap a period where the first data Data(N) is received.

Similar to the operation, the memory controller may output a second read command RD(N+1) corresponding to the Nth+1 page and may receive second data Data(N+1) through the data DATA channel. Also, in parallel with receiving the second data Data(N+1), the memory controller may output a status information request command CMD_Q (N+2) which requests status information about an Nth+2 page which will subsequently perform read and may receive status information Info_S(N+2) representing degradation statuses of memory cells of the Nth+2 page. Also, the memory controller may output a third read command RD(N+2) corresponding to the Nth+2 page after receiving the status information Info_S(N+2).

As illustrated in FIG. 10, despite that a relatively long time is consumed in inputting/outputting data, status information may be communicated through a command/address channel physically separated from a data channel, and thus, degradation statuses of memory cells where read is to be actually performed may be previously determined without reducing a data bandwidth, and based thereon, a memory operation may be controlled. Accordingly, the performance of a recovery operation or undesired ECC decoding processing may be skipped based on a degradation status, and thus, flow of a data recovery process may be reduced and resources consumed in ECC decoding processing or the recovery operation may decrease, thereby decreasing a reduction in performance of a memory system.

In the example embodiments, a case has been described where the memory controller receives status information about the Nth page immediately before outputting a read command corresponding to one page (for example, the Nth page), but example embodiments are not limited thereto. For example, the memory controller may schedule a plurality of read operations and may then previously determine positions of pages which are to be read subsequently. Therefore, the memory controller may also output a status information request command requesting status information about the Nth page at a time earlier than a case described in the example embodiments.

Also, according to the example embodiments described above, status information may be generated by block units and may be output by block units, or status information may be generated by page units and a unit of status information provided to the memory controller may be set to a block unit (a unit including status information about a plurality of pages). In this case, in a case where the memory controller sequentially reads several pages of the same block, the memory controller may previously receive status information about a block unit and may control a read operation on at least two pages subsequent thereto with reference to the received status information, without needing to receive status information each time a read operation is performed.

In the following description, examples of status information and a control example of a memory operation using the status information in some example embodiments are described.

Figure 11A:
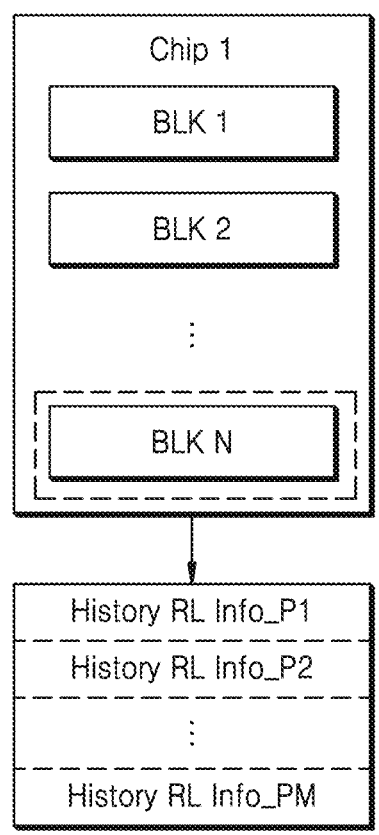
FIGS. 11A and 11B are diagrams illustrating an example which generates and manages a history read level.
Figure 11B:
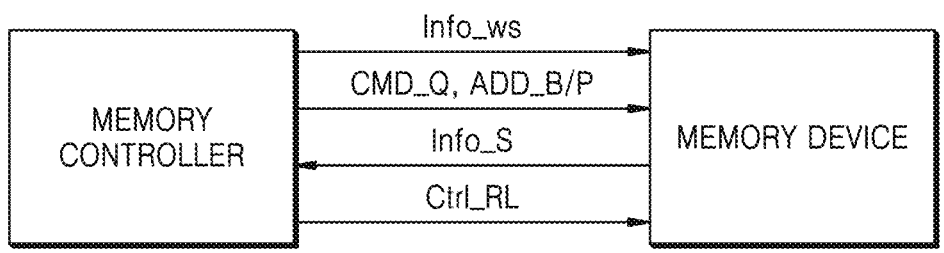

FIGS. 11A and 11B are diagrams illustrating an example which generates and manages a history read level.

Referring to FIG. 11A, a memory device may include one or more memory chips, and a memory cell array of each of the memory chips may include a plurality of blocks (for example, first to Nth blocks) BLK1 to BLKN. Also, each of the blocks may include first to Mth pages.

Data read from each page may be provided to a memory controller, and the memory controller may perform an error detection/correction operation on the data. When an error does not occur or only a correctable error occurs in a read operation, a read level used in the read operation may be managed as history read level information. For example, a history read level may be managed by block units, or may be managed by page units. In a case where the history read level is managed by page units, as illustrated in FIG. 11A, first to Mth history read level information (History RL Info_P1 to PM) may be managed on the Nth block (for example, the first to Mth pages included in the Nth block).

Referring to FIG. 11B, the memory controller may provide the memory device with write status information Info_ws including history read level information about a page of each block and may store write status information Info_ws in the memory device. Subsequently, the memory controller may output a status information request command CMD_Q to the memory device when performing a read operation on the memory device and may output an address ADD_B/P of a page and a block, each representing positions of memory cells on which read is to be performed, to the memory device. The memory controller may receive status information Info_S, representing a degradation status of a page on which read is to be performed, from the memory device.

The memory controller may determine an optimal or desired read level of a page on which read is to be performed, based on the status information Info_S received from the memory device and may provide the memory device with a level control signal Ctrl_RL for controlling a read level in a read operation on the page. In some example embodiments, a reference read level may be previously set in the memory device, and the memory controller may provide offset information, representing a level difference between the optimal or desired read level and the reference read level, as the level control signal Ctrl_RL to the memory device. Also, in some example embodiments, because each of memory cells stores pieces of data having two or more bits, the memory cells may include three or more threshold voltage distributions, and the level control signal Ctrl_RL may include information associated with optimal or desired read levels for determining three or more threshold voltage distributions.

Figure 12:
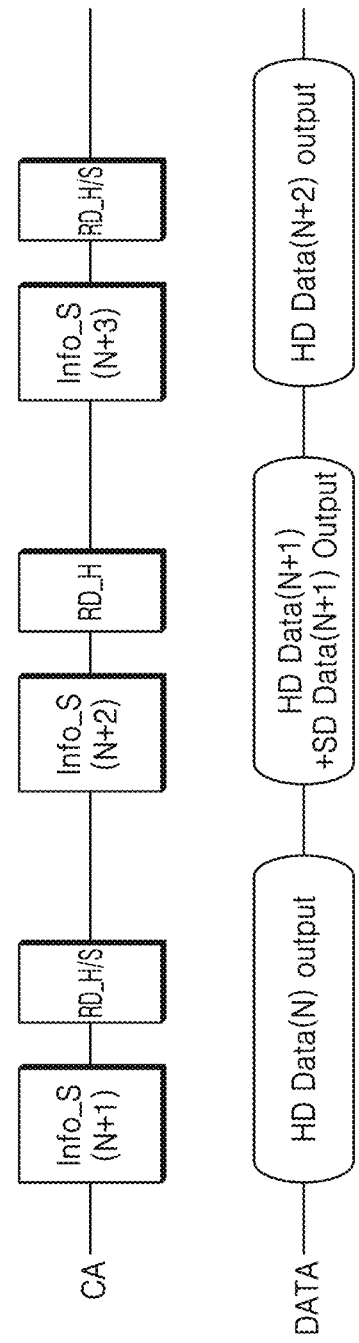
FIG. 12 is a diagram illustrating an example which controls an operation of reading data based on status information, according to some example embodiments.

FIG. 12 is a diagram illustrating an example which controls an operation of reading data based on status information, according to some example embodiments. In FIG. 12, for convenience of illustration, the illustration of a status information request command is omitted.

Referring to FIG. 12, first data read from an Nth page may be output to a memory controller in response to a first read command (not shown). For example, the first data may correspond to HD data HD Data(N) determined based on a normal read level. As depicted in FIG. 12 the command/ address CA channel and the data DATA channel may be physically separated channels.

The memory controller may receive status information Info_S(N+1) about an Nth+1 page in parallel with receiving the first data and may control a read operation on the Nth+1 page, based on the status information Info_S(N+1). For example, when it is determined that the degree of degradation of memory cells of the Nth+1 page is greater than a certain threshold, the memory controller may output a second read command RD_H/S which issues a request to read HD data and SD data from the Nth+1 page and may receive second data read from the Nth+1 page in response to the second read command RD_H/S. The second data may include HD data HD Data(N+1) determined based on a normal read level and SD data SD Data(N+1) determined based on at least one offset read level.

Also, the memory controller may receive status information Info_S(N+2) about an Nth+2 page in parallel with receiving the second data and may control a read operation on the Nth+2 page, based on the status information Info_S (N+2). For example, when it is determined that the degree of degradation of memory cells of the Nth+2 page is less than the certain threshold, the memory controller may output a third read command RD_H which issues a request to read HD data from the Nth+2 page and may receive third data read from the Nth+2 page in response to the third read command RD_H, and the third data may include HD data HD Data(N+2). Also, the memory controller may receive status information Info_S(N+3) about an Nth+3 page in parallel with receiving the third data, and when it is determined that the degree of degradation of memory cells of the Nth+3 page is greater than the certain threshold, the memory controller may output a fourth read command RD_H/S which issues a request to read HD data and SD data.

According to the example embodiments, normal ECC decoding processing using only HD data may be skipped on data read from a page where the degree of degradation is high, and SD ECC decoding processing using SD data may be performed, whereby a recovery algorithm which is high in error correction probability may be selectively performed. Accordingly, time and resources consumed in performing an undesired error correction operation and a recovery algorithm may be reduced.

Figure 13A:
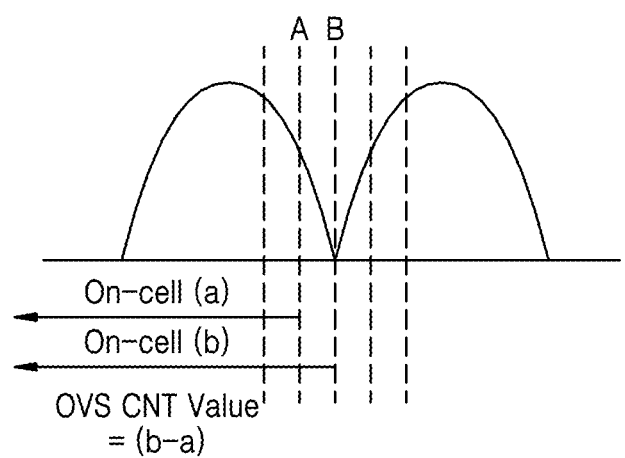
Figure 13B:
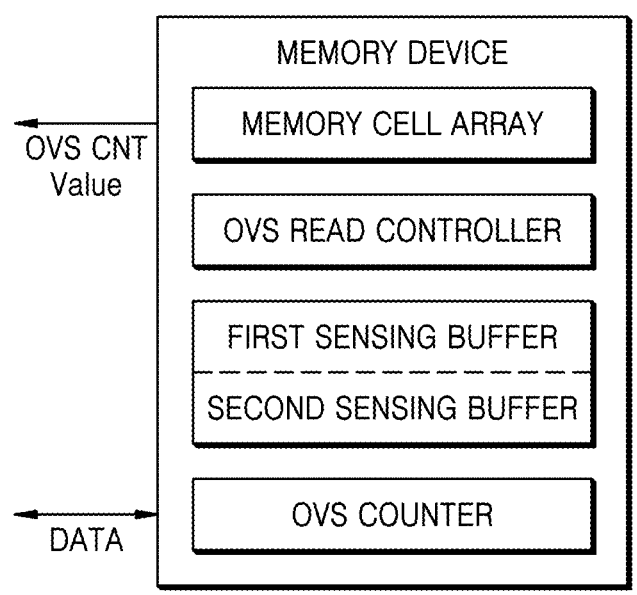
Figure 14:
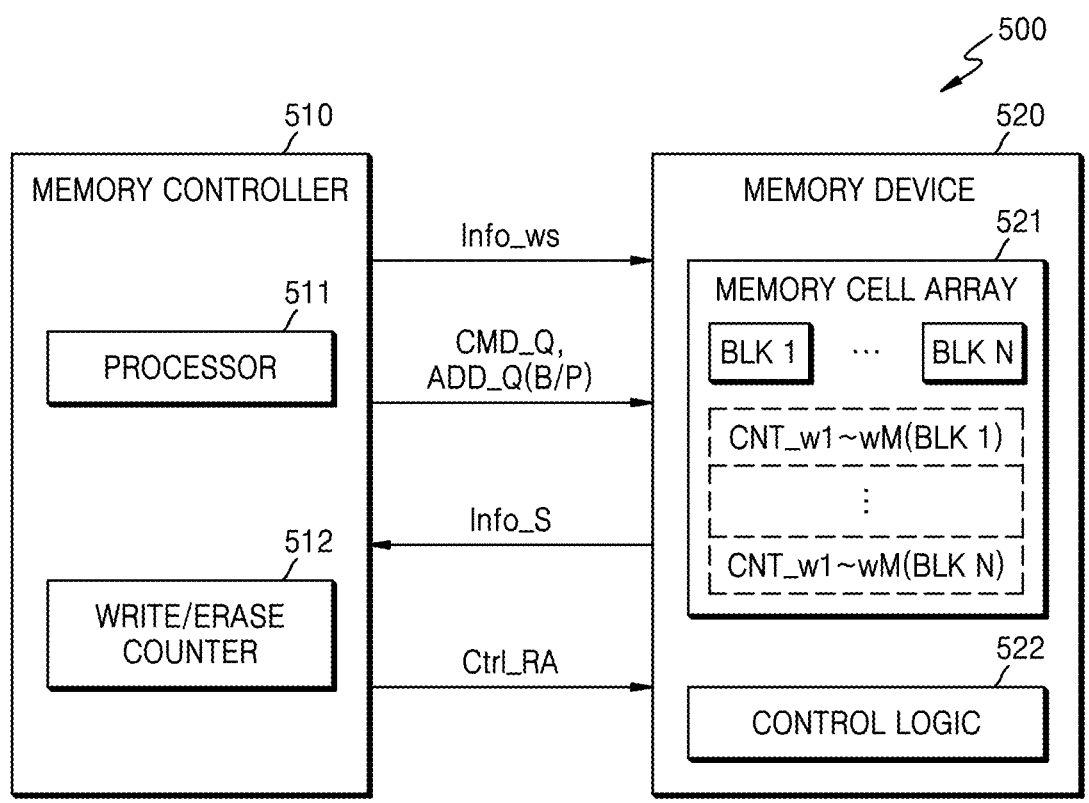
Figure 15:
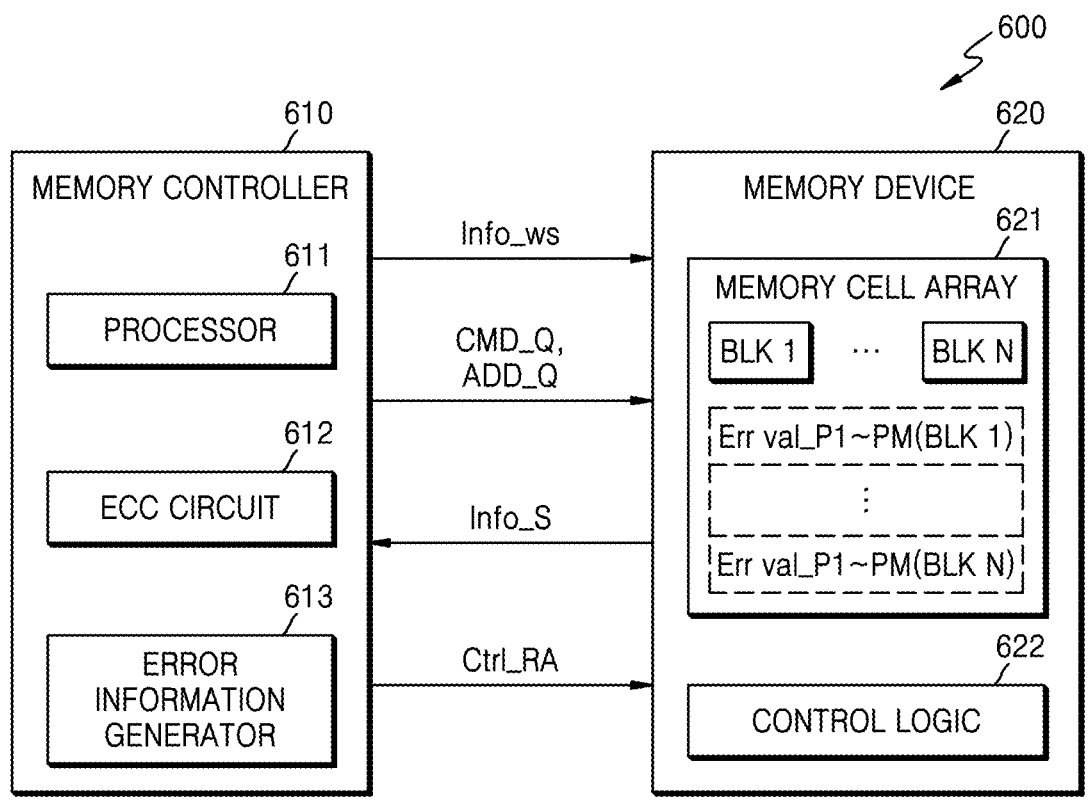

FIGS. 13A and 13B to 15 are block diagrams illustrating an implementation example of a memory system according to an example embodiment. FIGS. 13A, 13B, and 14 illustrate a case where information generated based on a counting value corresponds to status information according to some example embodiments, and FIG. 15 illustrates a case where an error value in a previous read operation corresponds to status information according to example embodiments.

In FIGS. 13A and 13B, an OVS counting value is illustrated as status information. Referring to FIG. 13A, an OVS counting function may be implemented as an on-chip function in a memory device NVM. The memory device NVM may perform a cell counting operation, based on data read with respect to at least two predetermined or alternatively desired read levels of a plurality of read levels illustrated by a dotted line, and for example, an on cell (a memory cell where a threshold voltage level is less than a read level) may be counted. For example, a cell counting operation may be performed based on a read level A and a read level B.

For example, when the number of errors in memory cells is relatively small and the read level A and the read level B are disposed close to a valley between threshold voltage distributions, a difference value between cell counting values calculated based on the read level A and the read level B may be relatively small. On the other hand, when a threshold voltage distribution is shifted based on a reduction in data retention characteristic and the number of errors in memory cells is relatively large, the difference value between the cell counting values may be calculated to be a large value. That is, when the difference value between the cell counting values is large, it may be determined that the degree of degradation of memory cells of a corresponding cell region is high.

In association with calculating an OVS counting value, the number "a" of on cells (or off cells) determined based on the read level A and the number "b" of on cells (or off cells) determined based on the read level B may be calculated. In some example embodiments, the number "a" of on cells determined based on the read level A and the number "b" of on cells determined based on the read level B may each be provided as an OVS counting value to the memory controller, or a difference value "b–a" between the number "a" of on cells determined based on the read level A and the number "b" of on cells determined based on the read level B may be provided as the OVS counting value to the memory controller.

Referring to FIG. 13B, the memory device may include elements associated with the calculation of an OVS counting value along with the memory cell array, and for example, at least some of the elements associated with the calculation of the OVS counting value may be elements included in the control logic according to the example embodiment described above.

An OVS read controller may control a read operation based on a plurality of read levels, in association with the calculation of the OVS counting value according to the example embodiments described above, and for example, data read based on the read level A may be stored in a first sensing buffer and data read based on the read level B may be stored in a second sensing buffer. Also, an OVS counter may perform a counting operation, based on the data stored in the first sensing buffer and the data stored in the second sensing buffer, and for example, may count the number of on cells of the data stored in the first sensing buffer and may count the number of on cells of the data stored in the second sensing buffer. Moreover, in some example embodiments, the OVS counter may provide, as the OVS counting value, a difference value between a counting value of on cells based on the read level A and a counting value of on cells based on the read level B to the memory controller.

FIG. 14 illustrates some example embodiments which store and use a write/erase counting value.

A memory system 500 may include a memory controller 510 and a memory device 520, the memory controller 510 may include a processor 511 and a write/erase counter 512, and the memory device 520 may include a memory cell array 521 and a control logic 522. The memory cell array 521 may include first to Nth blocks BLK 1 to BLK N, and moreover, status information according to some example embodiments may be stored in the memory cell array 521. In FIG. 14, it is illustrated that a region storing status information is differentiated from the first to Nth blocks BLK 1 to BLK N, but the status information may also be stored in the first to Nth blocks BLK 1 to BLK N.

According to the example embodiments described above, status information may be managed by page units, and for example, a write counting value may be managed on each page and an erase counting value may be managed on each page. For example, an erase operation may be performed by block units in flash memory, and thus, the same erase counting value may be managed on pages included in the same block. A write/erase counting operation may be performed by the memory controller 510, and the memory controller 510 may provide a write/erase counting value of each page as write status information Info_ws to the memory device 520.

In some example embodiments, a case where a write counting value is managed may be described for example.

When it is assumed that one block includes M number of pages, M number of write counting values may be stored in the memory cell array 521 for each of the first to Nth blocks BLK 1 to BLK N. For example, first to Mth write counting values CNT_w1 to wM(BLK 1) may be stored in the memory cell array 521 in association with the first block BLK 1, and first to Mth write counting values CNT_w1 to wM(BLK N) may be stored in the memory cell array 521 in association with the Nth block BLK N. The memory controller 510 may output a status information request command CMD_Q which issues a request to transfer status information Info_S and may output an address ADD_Q(B/P) indicating a position of a page requiring the status information Info_S together. In a case where status information is managed by page units, the address ADD_Q(B/P) may include a block address and a page address respectively representing positions of a block and a page. Alternatively, in a case where status information is managed by block units, the address ADD_Q(B/P) may include a block address representing a position of a block including a page.

The memory controller 510 may receive the status information Info_S, and based thereon, the memory controller 510 may determine degradation statuses of memory cells of a page. In some example embodiments, the memory controller 510 may control various memory operations by using the status information Info_S, and for example, may output a control signal Ctrl_RA for allowing a recovery algorithm optimized or desired for a degradation status to be performed. The control signal Ctrl_RA may be output through various channels, and for example, may be output through a command/address channel in transferring a read command corresponding to a page, or the control signal Ctrl_RA may be output through a control channel which is additionally included in the memory system 500.

FIG. 15 illustrates an example which stores and uses error information in a previous read operation.

A memory system 600 may include a memory controller 610 and a memory device 620, the memory controller 610 may include a processor 611, an ECC circuit 612, and an error information generator 613, and the memory device 620 may include a memory cell array 621 and a control logic 622.

According to the example embodiments described above, status information may be managed by page units, and for example, information associated with an error occurring in a read operation previously performed on each page may be managed. The information associated with the error may include a bit error rate or the number of errors occurring in each page. Alternatively, the information associated with the error may include information representing whether the number of errors is greater than a criterion, and for example, the information associated with the error may be processed in various forms.

The ECC circuit 612 may generate an error detection result of data, and the error information generator 613 may generate write status information Info_ws including information associated with a previous error value, based on various schemes. The write status information Info_ws may be provided to the memory device 620. The memory device 620 may store status information Info_S, and the status information Info_S may include information about a previous error value for each page of each block. For example, as illustrated in FIG. 15, first to Mth previous error values Err val_P1 to PM(BLK 1) may be stored in the memory cell array 621 in association with M number of pages of a first block BLK 1, and first to Mth previous error values Err val_P1 to PM(BLK N) may be stored in the memory cell array 621 in association with M number of pages of an Nth block BLK N.

The memory controller 610 may output a status information request command CMD_Q which issues a request to transfer status information Info_S and may output an address ADD_Q indicating a position of a page requiring the status information Info_S together. The memory controller 610 may receive the status information Info_S, and based thereon, the memory controller 510 may determine degradation statuses of memory cells of a page. In some example embodiment, the memory controller 610 may output a control signal Ctrl_RA for allowing a recovery algorithm optimized or desired for a degradation status to be performed, based on the status information Info_S.

Figure 16:
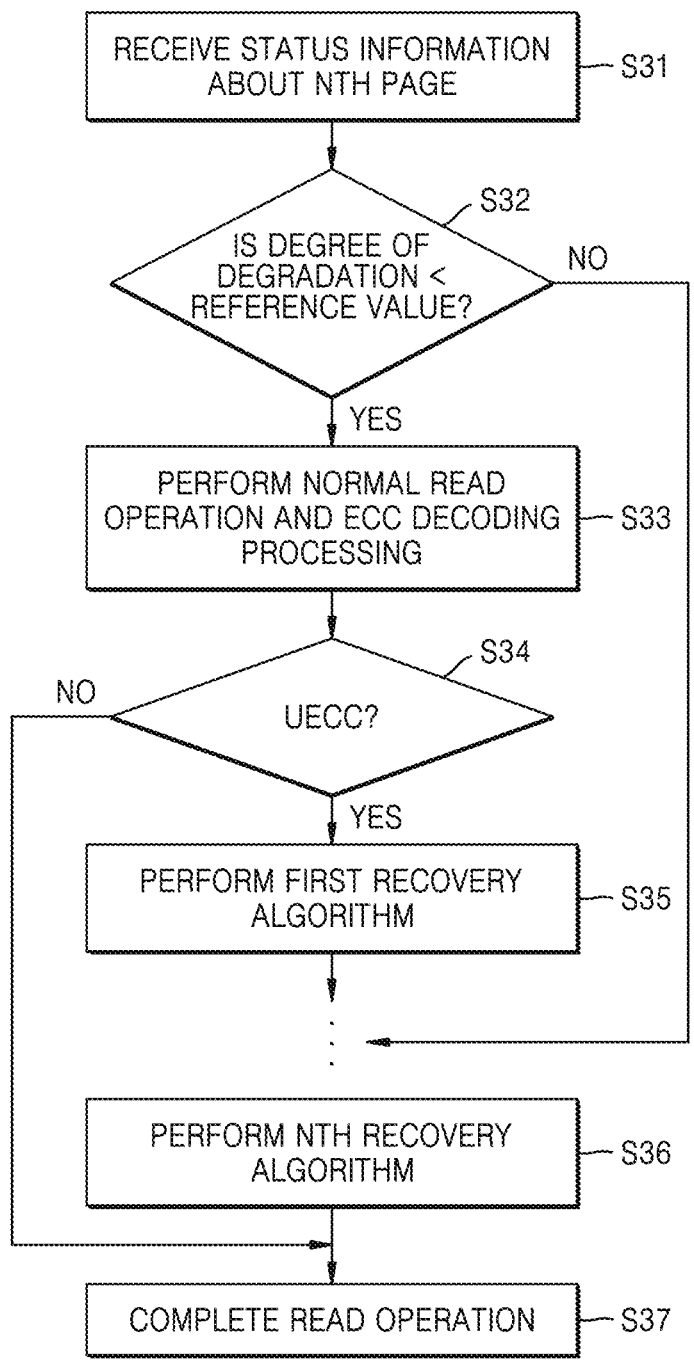
FIG. 16 is a flowchart illustrating an operating method of a memory system, according to some example embodiments.

FIG. 16 is a flowchart illustrating an operating method of a memory system, according to some example embodiments.

Before performing a read operation on an Nth page, a memory controller may output a status information request command corresponding to the Nth page to a memory device and may receive status information about the Nth page from the memory device in operation 531. Also, the memory controller may determine the degree of degradation of memory cells of the Nth page, based on the status information, and may determine whether the degree of degradation is less than a reference value in operation S32. For example, when the degree of degradation is less than the reference value, because the degree of degradation of memory cells of the Nth page is not large, ECC decoding processing using normal data (for example, HD data according to the example embodiments described above) may be performed along with performing a normal read operation in operation S33.

Whether an uncorrectable error UECC is in data of the Nth page may be determined in operation S34, and when there is no uncorrectable error UECC, a read operation may be completed in operation S37. On the other hand, when there is the uncorrectable error UECC, recovery algorithms which consume different resources and time and have various error recovery capabilities may be sequentially performed. For example, a first recovery algorithm may be performed on data of the Nth page in operation S35, and when an error is recovered, a read operation may be completed in operation S37. On the other hand, when an error is not recovered through the first recovery algorithm, a next recovery algorithm may be performed, and an Nth recovery algorithm may be finally performed in operation S36. When an error is not recovered through the Nth recovery algorithm, read fail of data may be finally determined, and when an error is recovered by the Nth recovery algorithm, a read operation may be completed in operation S37.

Furthermore, when it is determined that the degree of degradation is greater than the reference value, based on the status information, the execution of at least one recovery algorithm may be skipped based on the degree of degradation. For example, when the degree of degradation is greater than the reference value and is relatively low, a recovery algorithm may be executed to perform ECC decoding processing using two pieces of SD data using two offset read levels. On the other hand, when the degree of degradation is greater than the reference value and is relatively high, a recovery algorithm for detecting an optimal or desired valley between threshold voltage distributions may be executed, or a recovery algorithm may be executed to perform ECC decoding processing using three or more pieces of SD data, or a recovery algorithm for recovering an error may be executed by using read-requested data such as RAID and other data together.

Figure 17:
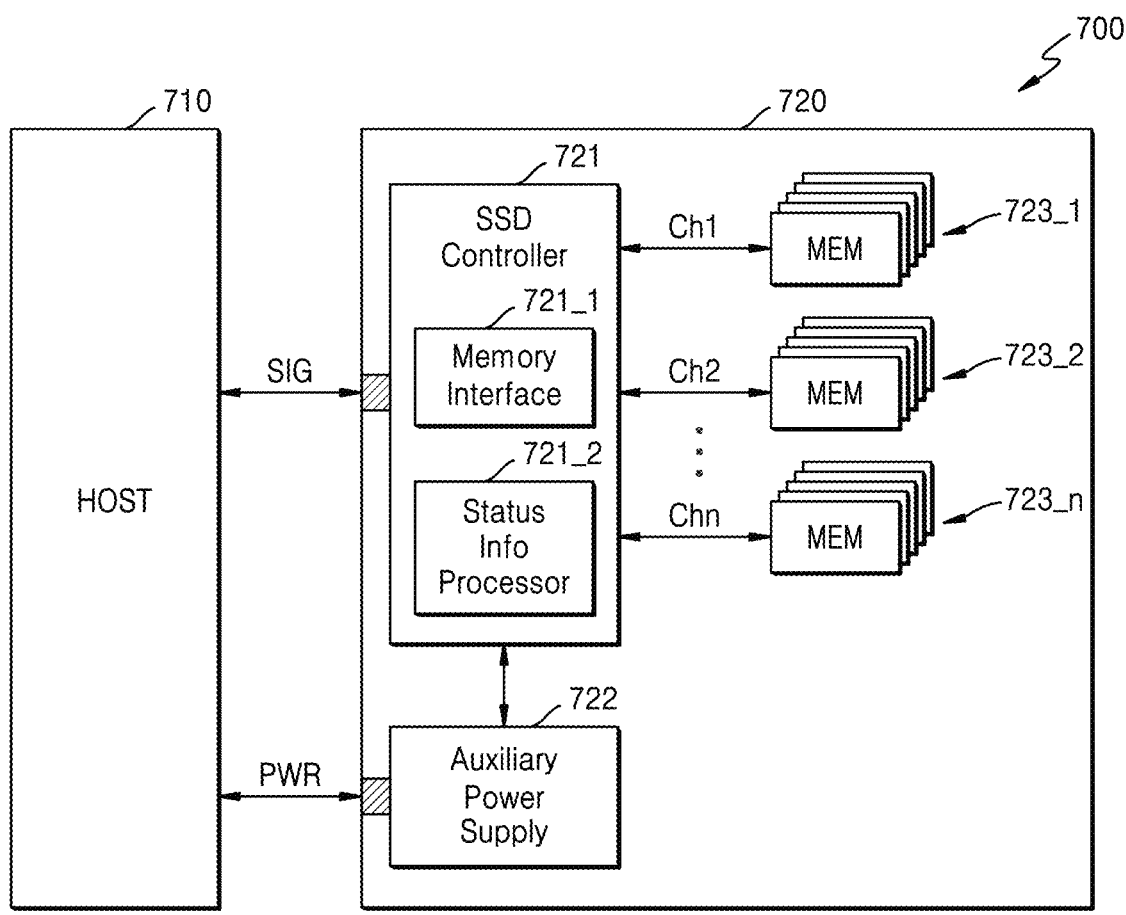
FIG. 17 is a block diagram illustrating an example where a memory system according to some example embodiments is applied to a solid state drive (SSD) system.

FIG. 17 is a block diagram illustrating an example where a memory system according to some example embodiments is applied to a SSD system 700.

Referring to FIG. 17, the SSD system 700 may include a host 710 and an SSD 720. The SSD 720 may transmit or receive a signal SIG to or from the host 710 through a signal connector and may be supplied with power PWR through a power connector. The SSD 720 may include an SSD controller 721, an auxiliary power supply 722, and non-volatile memory devices 723_1 to 723_$n$. The non-volatile memory devices 723_1 to 723_$n$ may include NAND flash memory. In this case, the SSD 720 may be implemented by using the example embodiments described above with reference to FIGS. 1 to 16.

For example, the SSD controller 721 included in the SSD 720 may include a memory interface 721_1 and a status information processor 721_2 according to the example embodiments described above, and each of the non-volatile memory devices 723_1 to 723_$n$ may store status information (not shown). Also, the SSD controller 721 and the non-volatile memory devices 723_1 to 723_$n$ may communicate with each other through a plurality of channels, and a command/address channel may be physically separated from a data channel. Also, the SSD controller 721 and the non-volatile memory devices 723_1 to 723_$n$ may communicate, through the command/address channel, a status information request command and status information according to the example embodiments described above. Also, the SSD controller 721 may control a memory operation on each of the non-volatile memory devices 723_1 to 723_$n$ with reference to the status information, and for example, may adjust a read level, adjust the kind of read data, and control ECC decoding processing and a recovery operation.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Hereinabove, example embodiments have been described in the drawings and the specification. Example embodiments have been described by using the terms described herein, but this has been merely used for describing the inventive concepts and has not been used for limiting a meaning or limiting the scope of the inventive concept defined in the following claims. Therefore, it may be understood by those of ordinary skill in the art that various modifications and other example embodiments may be implemented from the inventive concepts. Accordingly, the spirit and scope of the inventive concepts may be defined based on the spirit and scope of the following claims.

While the inventive concepts have been particularly shown and described with reference to example embodiments thereof, it will be understood that various changes in form and details may be made therein without departing from the spirit and scope of the following claims.

What is claimed is:

1. An operating method of a memory controller controlling a memory device, the operating method comprising:
   transferring a first read command corresponding to a first cell region of the memory device through a first channel;
   receiving first data, read from the first cell region, from the memory device through a second channel physically separated from the first channel;
   transferring a first status information request command through the first channel, the first status information request command requesting a transfer of status information about a second cell region of the memory device;
   receiving the status information about the second cell region from the memory device through the first channel; and
   transferring a second read command corresponding to the second cell region of the memory device through the first channel,
   wherein at least a portion of a period in which the status information is received through the first channel, overlaps a period where the first data is received through the second channel.

2. The operating method of claim 1, wherein
   the second cell region corresponds to a page included in one block included in the memory device, and
   the first status information request command includes address information representing a position of the second cell region.

3. The operating method of claim 1, wherein the status information is
   generated by the memory controller,
   stored in a memory cell array of the memory device,
   read from the memory cell array in response to the status information request command, and
   received through the first channel.

4. The operating method of claim 1, wherein at least a portion of a period in which the first status information request command is transferred through the first channel, overlaps the period where the first data is received through the second channel.

5. The operating method of claim 1, further comprising:
   controlling a read level in a read operation on the second cell region based on a degradation status of each of memory cells of the second cell region, the degradation status determined based on the status information.

6. The operating method of claim 1, wherein
   the status information includes information associated with a read level in a read operation previously performed on the second cell region of the memory device, and
   the operating method further includes controlling the read level in the read operation on the second cell region to correspond to a read level included in the status information.

7. The operating method of claim 1, wherein
   the second read command includes a command of a first type issuing a request to output hard decision (HD) data based on a normal read level, or the second read command includes a command of a second type issuing a request to output soft decision (SD) data based on at least one offset read level along with the HD data, and
   based on the status information, when a degree of degradation of memory cells of the second cell region is greater than a certain threshold, the second read command includes the command of the second type.

8. The operating method of claim 7, further comprising:
   receiving second data from the memory device through the second channel, the second data including the HD data and the SD data each read from the second cell region; and
   performing SD error correction code (ECC) decoding processing using the HD data and the SD data on the second data, without HD ECC decoding processing using the HD data.

9. The operating method of claim 1, further comprising:
   receiving second data from the memory device through the second channel, the second data read from the second cell region; and
   performing a recovery operation for recovering an error when an uncorrectable error occurs in the second data,
   wherein a plurality of recovery modules associated with error recovery are applied to the memory controller, and
   a recovery module executed for recovering an error of the second data is differently selected based on the status information.

10. The operating method of claim 1, further comprising:
    receiving second data from the memory device through the second channel, the second data read from the second cell region;
    transferring a second status information request command through the first channel, the second status information request command requesting a transfer of status information about a third cell region of the memory device; and
    receiving through the first channel, the status information about the third cell region from the memory device,
    wherein at least a portion of a period in which the status information about the third cell region is received through the first channel, overlaps a period where the second data is received through the second channel.

11. A memory controller communicating with a memory device, the memory controller comprising:
    a processor configured to control a memory operation on the memory device;
    a memory interface connected to the memory device through a first channel communicating a command/address and a second channel communicating data, the second channel is physically separated from the first channel;
    an error correction code (ECC) circuit configured to perform ECC decoding processing on data read from the memory device to correct an error of the data read from the memory device; and
    a status information processor configured to receive and process status information transferred from the memory device through the first channel, the status information representing a degradation status of memory cells of the memory device,
    the memory controller is configured to receive status information about a first cell region through the first channel before a read operation on the first cell region of a memory cell array of the memory device is performed, and the processor is configured to differently control a read level in the read operation on the first cell region according to a degradation status of memory cells of the first cell region, or differently perform an error correction or recovery operation on data read from the first cell region, based on the status information.

12. The memory controller of claim 11, wherein
the memory interface is configured to output a status information request command, and
the status information request command issues a request to transfer status information about the first cell region, through the first channel.

13. The memory controller of claim 12, wherein
the memory interface is configured to output through the first channel, a read command corresponding to a second cell region of the memory cell array before outputting the status information request command corresponding to the first cell region, and
at least a portion of a period in which the status information about the first cell region is received through the first channel, overlaps a period where data read from the second cell region is received through the second channel.

14. The memory controller of claim 11, wherein the memory cell array includes a plurality of blocks, and each of the plurality of blocks includes a plurality of pages,
the first cell region corresponds to one of the plurality of pages, and the status information is received by units of one or more pages each including the first cell region.

15. The memory controller of claim 11, wherein the status information includes at least one piece of information selected from among:
an on-chip valley search (OVS) counting value corresponding to a difference value between a number of on cells and a number of off cells determined based on at least two read levels,
a read level applied to at least one read operation previously performed on the memory device,
a write or erase counting value corresponding to the memory cell array, or
an error value occurring in the at least one read operation previously performed on the memory device.

16. The memory controller of claim 15, wherein the at least one piece of information of the status information is stored in the memory cell array, and the status information is read from the memory cell array and received through the first channel.

17. The memory controller of claim 11, wherein the memory interface is configured to output a read command issuing a request to output hard decision (HD) data based on a normal read level on the first cell region, or output a read command issuing a request to output soft decision (SD) data based on at least one offset read level along with the HD data on the first cell region, based on the status information.

18. A memory system comprising:
a memory device including,
a memory cell array including a plurality of pages, each page including a plurality of memory cells;
a control logic configured to control a memory operation on the memory cell array and generate status information representing a degradation status of the plurality of memory cells; and
an interface circuit configured to communicate a command/address through a first channel and communicate data through a second channel physically separated from the first channel,
the interface circuit is configured to
sequentially receive from outside the memory device, a first read command corresponding to a first page and a second read command corresponding to a second page,
receive a status information request command issuing a request to transfer status information about the second page through the first channel before the second read command is received,
output the status information about the second page through the first channel, and
output through the second channel, data of the first page read in response to the first read command in parallel with outputting the status information about the second page.

19. The memory system of claim 18, further comprising:
a memory controller configured to communicate with the memory device through the first channel and the second channel and output the first read command, the second read command, and the status information request command,
wherein the memory controller is configured to differently control a read level in a read operation on the second page according to a degradation status of each of memory cells of the second page, or differently perform an error correction or recovery operation on data read from the second page, based on the status information about the second page.

20. The memory system of claim 19, wherein
the status information is stored in the memory cell array and includes information associated with a read level in a read operation previously performed on the plurality of pages, and
the memory device is configured to output status information to the memory controller in response to the status information request command from the memory controller, the status information associated with the read level in the read operation performed on the second page.

* * * * *